United States Patent [19]

Furuya et al.

[11] Patent Number: 5,886,691

[45] Date of Patent: Mar. 23, 1999

[54] DISPLAY CONTROL METHOD FOR DISPLAY HAVING BUTTONS REPRESENTING SELECTABLE VOTING ITEMS IN WHICH ONLY MARKS ASSIGNED TO SELECTED ITEMS CONTINUE TO BE DISPLAYED UPON SELECTION

[75] Inventors: Miki Furuya, Saitama; Yukiko Ohkura, Tokyo; Tetsuya Kohno, Kanagawa; Keiji Yuzawa; Yuriko Kishitaka, both of Saitama; Kuriko Takeshima, Tokyo, all of Japan

[73] Assignee: Sony Corporation, Tokyo, Japan

[21] Appl. No.: 897,835

[22] Filed: Jul. 21, 1997

[30]    Foreign Application Priority Data

Jul. 24, 1996 [JP] Japan .................................... 8-213158

[51] Int. Cl.⁶ ....................................................... H04N 7/14
[52] U.S. Cl. ............................... 345/327; 348/2; 348/13; 348/10; 455/2; 455/6.2
[58] Field of Search ...................................... 345/326, 327; 348/1, 2, 6, 7, 12, 13, 10; 455/2, 3.1, 3.2, 4.1, 4.2, 5.1, 6.1, 6.2

[56]         References Cited

U.S. PATENT DOCUMENTS

| 5,539,822 | 7/1996 | Lett ........................................... 348/2 X |
| 5,606,726 | 2/1997 | Yoshinobu ............................... 455/5.1 |
| 5,663,757 | 9/1997 | Morales .................................... 348/13 |

*Primary Examiner*—Nathan Flynn
*Assistant Examiner*—John W. Miller
*Attorney, Agent, or Firm*—Jay H. Maioli

[57]            ABSTRACT

An interactive display apparatus transmits voting information to a vote receiving center. Prior to voting, all voting items are displayed. A mark or a button is also displayed for each voting item and used for selecting one of a plurality of voting items. After one of the voting items is chosen, only the mark assigned to the selected voting item is displayed, erasing the marks for the other unselected voting items. In this way, the user is capable of recognizing that voting has been completed with ease from a voting screen.

7 Claims, 22 Drawing Sheets

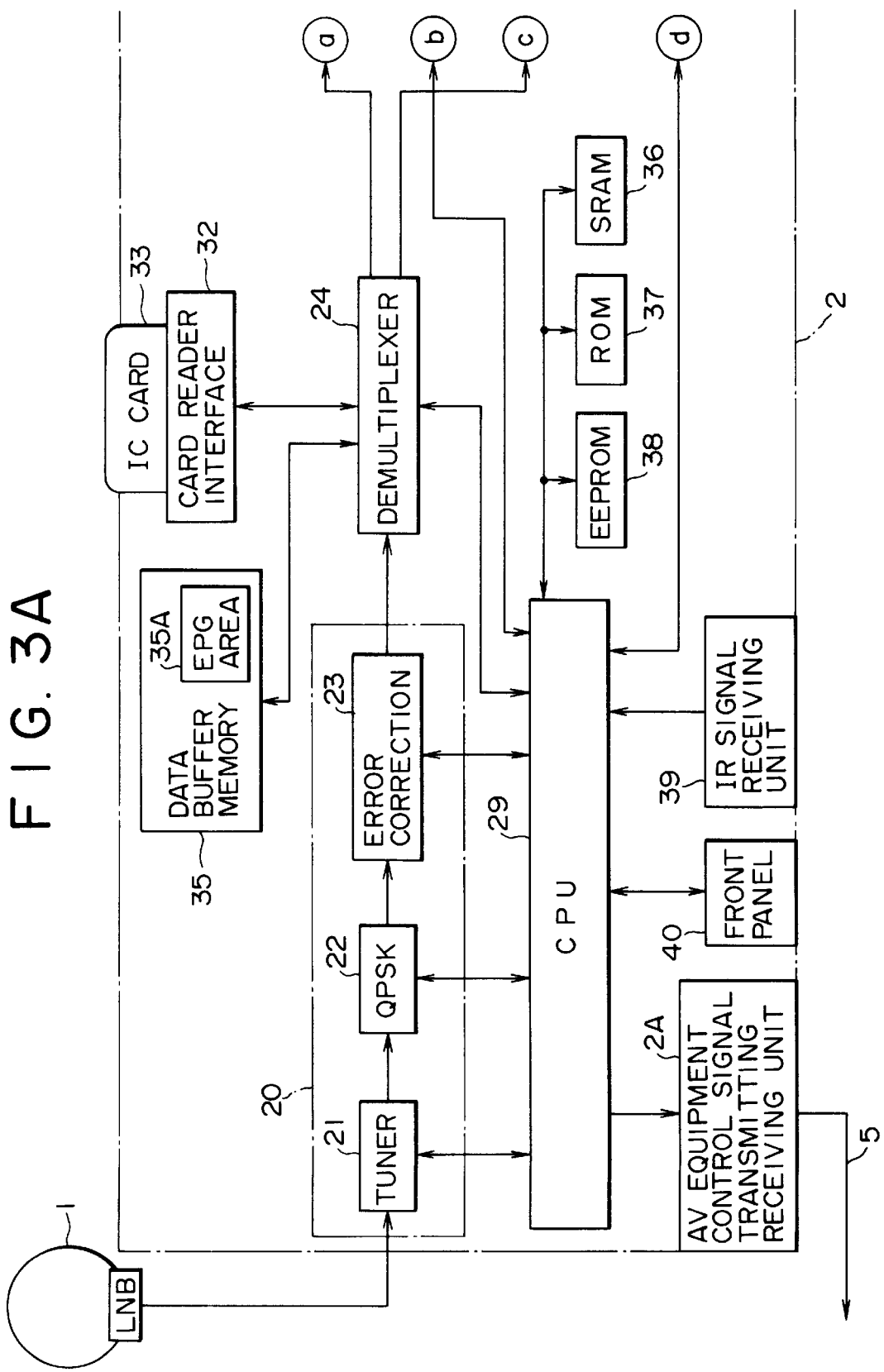

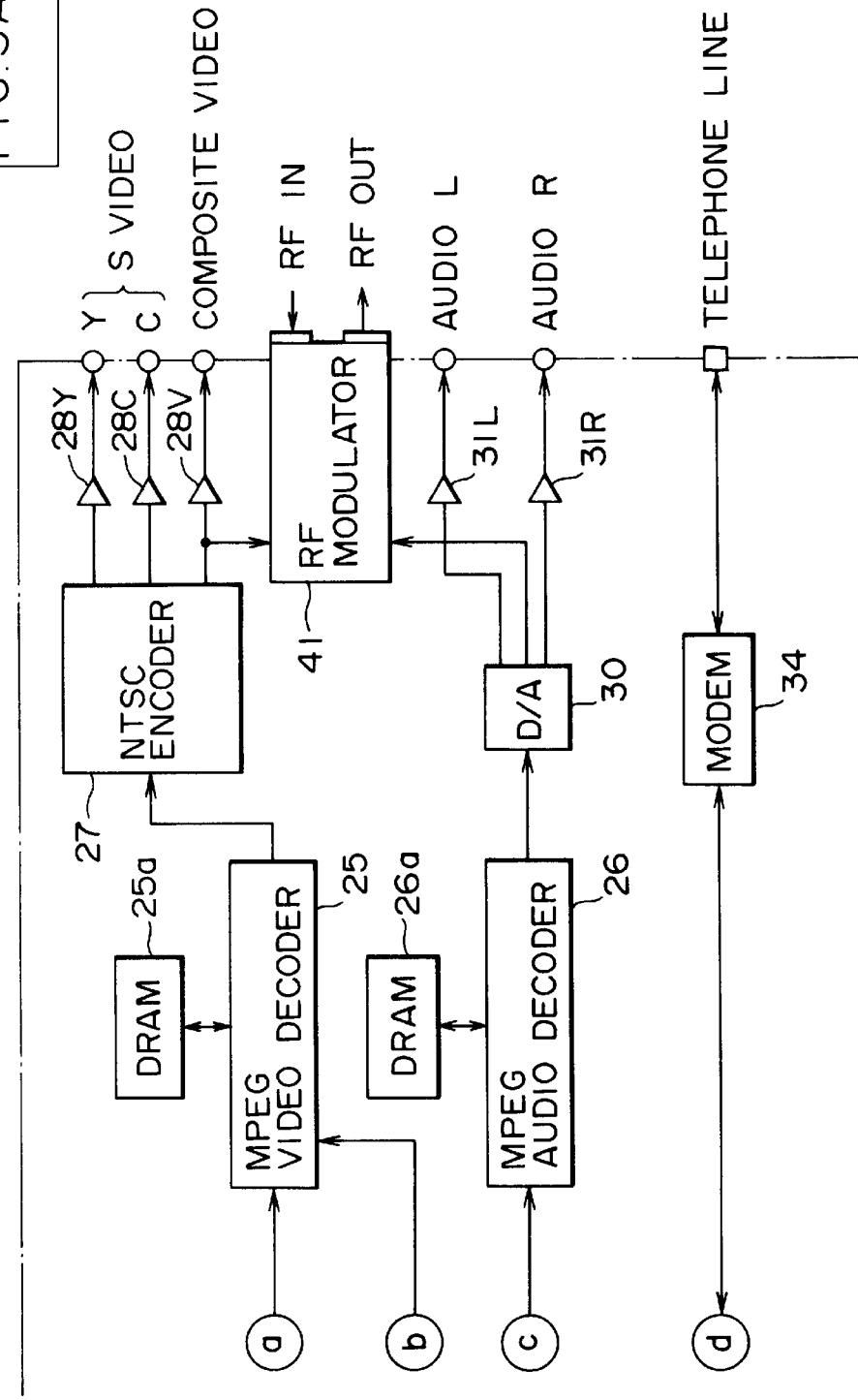

FIG. 5

```
DM_voting_descriptor () {
    descriptor_tag                      8    uimsbf
    descriptor_length                   8    uimsbf
    voting_type                         8    uimsbf
    voting_id                           8    uimsbf
    host_number                        32    bslbf
    start_offset                       24    uimsbf
    disply_duration                    24    uimsbf
    voting_duration                    24    uimsbf
    voting_name_length                  8    uimsbf
    for ( i=0 ; i<N ; i++ ) {
        char                            8    uimsbf
    }
    code_loop_length                    8    uimsbf
    for ( i=0 ; i<N ; i++ ) {
        voting_code                     8    uimsbf
        tel_number                     64    bslbf
        code_name_length                8    uimsbf
        for ( j=0 ; j<M ; j++ ) {
            char                        8    uimsbf
        }
    }
}
```

F I G. 6

| voting_type | 1 | 2 | 3 | 4 |
|---|---|---|---|---|
| TRANSMISSION INFORMATION | NONE | service_id (16)<br>event_id (16)<br>voting_id (8)<br>voting_code (8) | CA_system_id (16)<br>card_id (48)<br>service_id (16)<br>event_id (16)<br>voting_id (8)<br>voting_code (8) | CA_system_id (16)<br>card_id (48)<br>service_id (16)<br>event_id (16)<br>voting_id (8)<br>voting_code (8) |

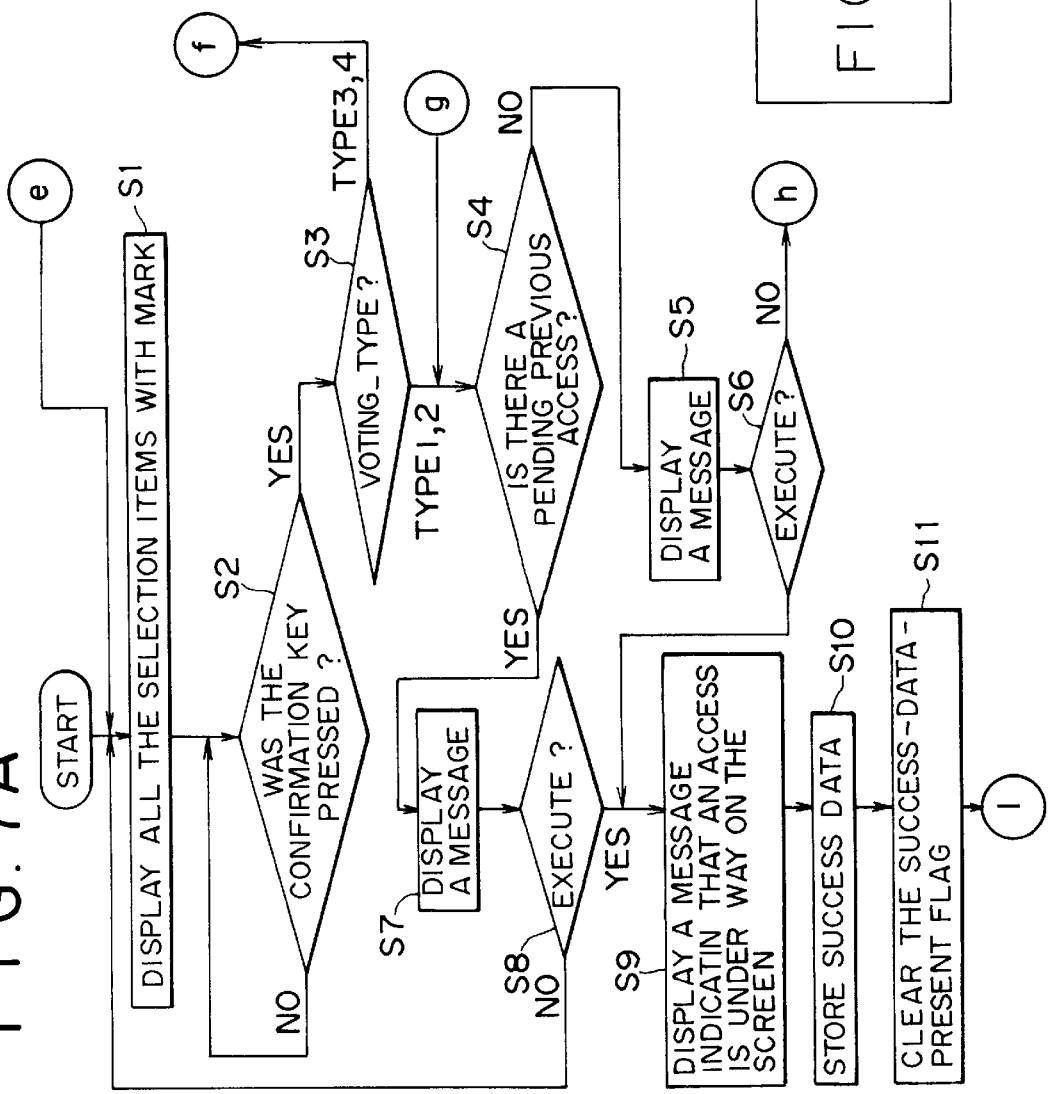

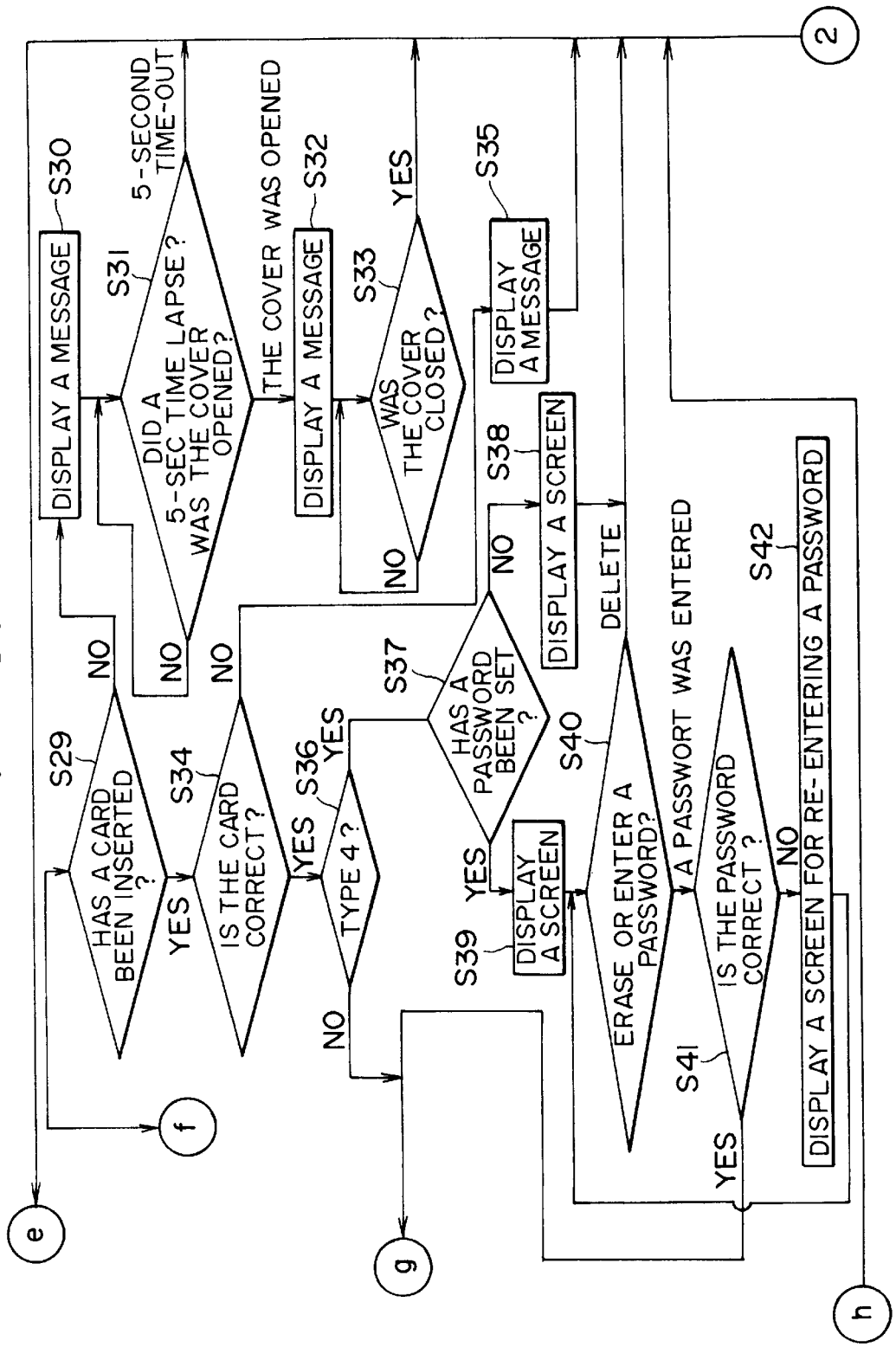

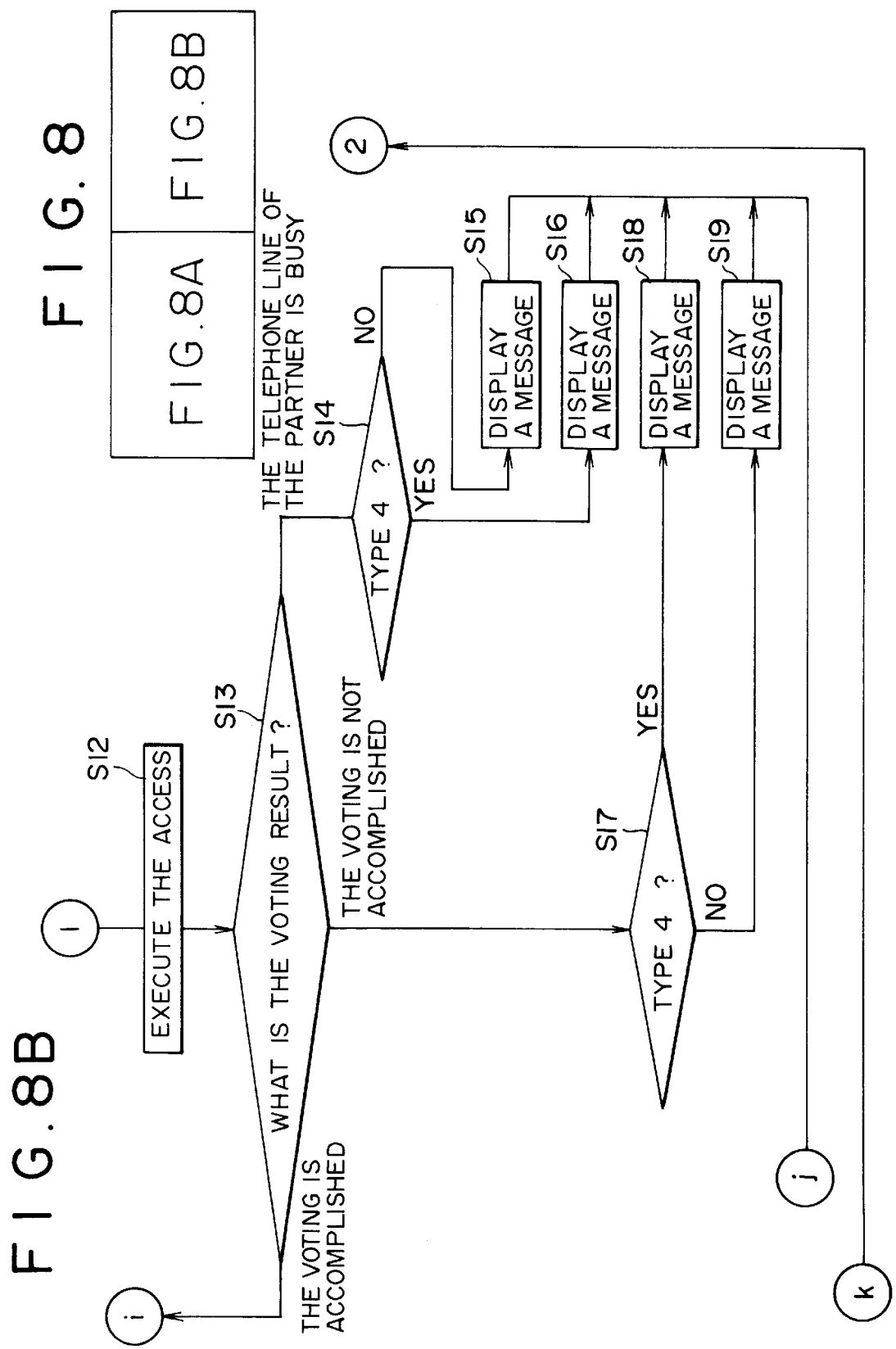

A SPECIAL PROGRAM : 1995 RANKING    112

CLOSE THE COVER

A SPECIAL PROGRAM : 1995 RANKING    112

AN ACCESS CAN NOT BE MADE WITH THE CARD.
CHECK WHETHER OR NOT A CORRECT CARD HAS
BEEN INSERTED.
AN INQUIRY CAN BE MADE TO PERFEC TV

FIG. 13

A SPECIAL PROGRAM : 1995 RANKING          112

THE BEST TEN PROGRAMS YOU SELECTED FOR
THIS YEAR

THE ONE YOU SELECTED:
    TITLE 5
A PASSWORD IS REQUIRED.
SET A PASSWORD USING A
TELEVISION - WATCHER -
AGE - LIMIT SETTING OF AN
INITIALIZATION OF THE MENU.

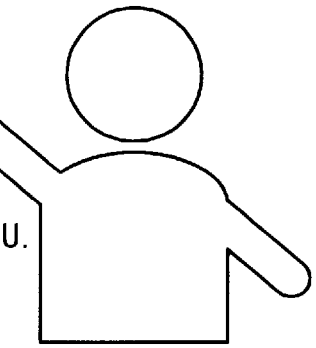

A SPECIAL PROGRAM : 1995 RANKING          112

THE BEST TEN PROGRAMS YOU SELECTED FOR
THIS YEAR

THE ONE YOU SELECTED:
    TITLE 5
PRESS THE CONFIRMATION
BUTTON IN ORDER TO
MAKE AN ACCESS.
THEN, ENTER A
PASSWORD BY
PRESSING THE
NUMETRIC BUTTONS.

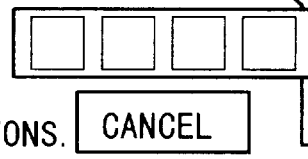

CANCEL

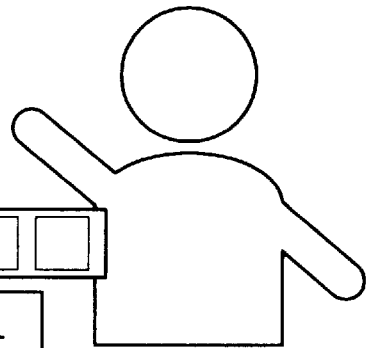

A SPECIAL PROGRAM : 1995 RANKING        112

AN ACCESS FAILURE. PLEASE TRY ONCE MORE.
THE BEST TEN PROGRAMS YOU
FOR THIS YEAR
THE ONE YOU SELECTED:

TITLE 5

A SPECIAL PROGRAM : 1995 RANKING        112

AN ACCESS FAILURE.
THE BEST TEN PROGRAMS YOU
SELECTED FOR THIS YEAR
  THE ONE YOU SELECTED:

TITLE 5

THIS ACCESS CAN BE RE-
TRIED AS A CENTER
ACCESS RELATED
TO PROGRAMS OF    OK
THE MENU.

FIG. 21

A SPECIAL PROGRAM : 1995 RANKING     112

AN ACCESS FAILURE.
THE TELEPHONE LINE IS BUSY OR NOT
CONNECTED CORRECTLY.
THE BEST TEN PROGRAMS YOU
SELECTED FOR THIS YEAR
    THE ONE YOU SELECTED:
        TITLE 5
THIS ACCESS CAN BE RE-
TRIED AS A CENTER
ACCESS RELATED
TO PROGRAMS OF      OK
THE MENU.

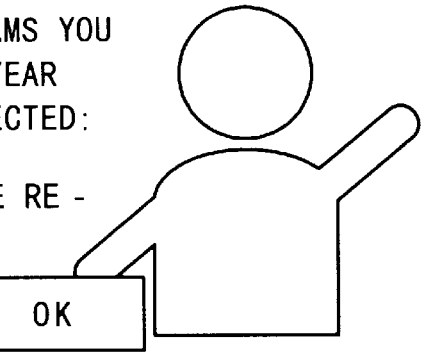

FIG. 22

A SPECIAL PROGRAM : 1995 RANKING     112

AN ACCESS FAILURE.
THE TELEPHONE LINE IS BUSY OR NOT
CONNECTED CORRECTLY.
THE BEST TEN PROGRAMS YOU
SELECTED FOR THIS YEAR
    THE ONE YOU SELECTED:
        TITLE 5

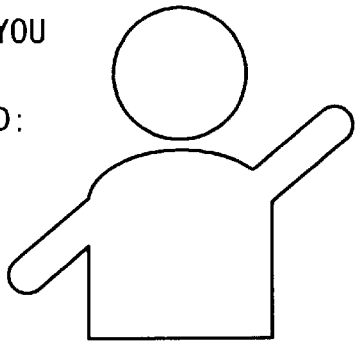

A SPECIAL PROGRAM : 1995 RANKING          112

THANK YOU FOR YOUR PARTICIPATION
THE BEST TEN PROGRAMS YOU SELECTED FOR
THIS YEAR

THE ONE YOU SELECTED:
　　　　TITLE 5

A SPECIAL PROGRAM : 1995 RANKING          112

THE ACCESS WAS COMPLETED.
THE BEST TEN PROGRAMS YOU SELECTED FOR
THIS YEAR

THE ONE YOU SELECTED:
　　　　TITLE 5

A SPECIAL PROGRAM : 1995 RANKING          112
  THE ACCESS WAS COMPLETED.
  THE BEST TEN PROGRAMS YOU SELECTED FOR
  THIS YEAR
     TITLE 1
     TITLE 2
     TITLE 3
     TITLE 4
  ■  TITLE 5
     TITLE 6
     TITLE 7
     TITLE 8
     TITLE 9
     TITLE 10

F I G. 26
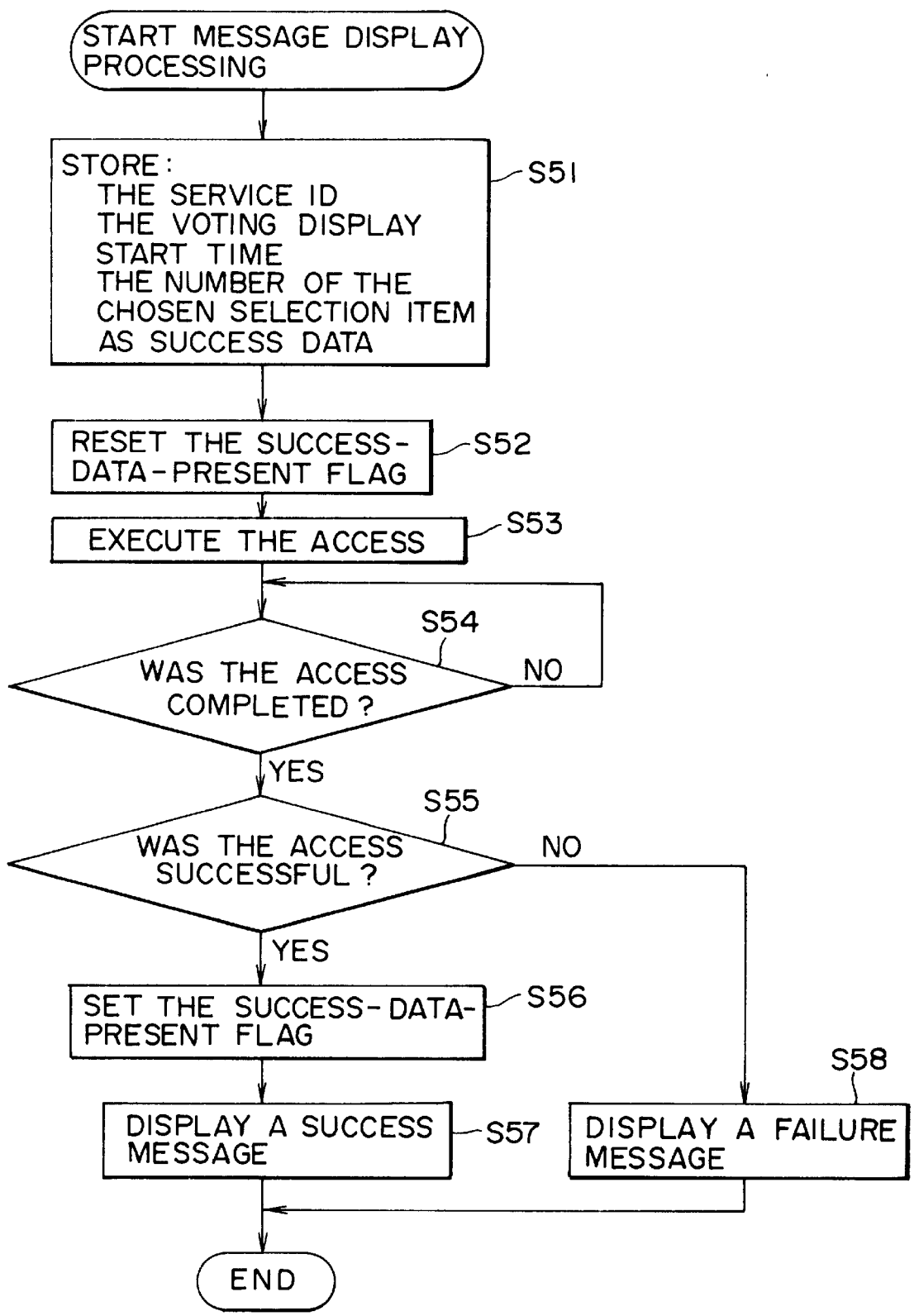

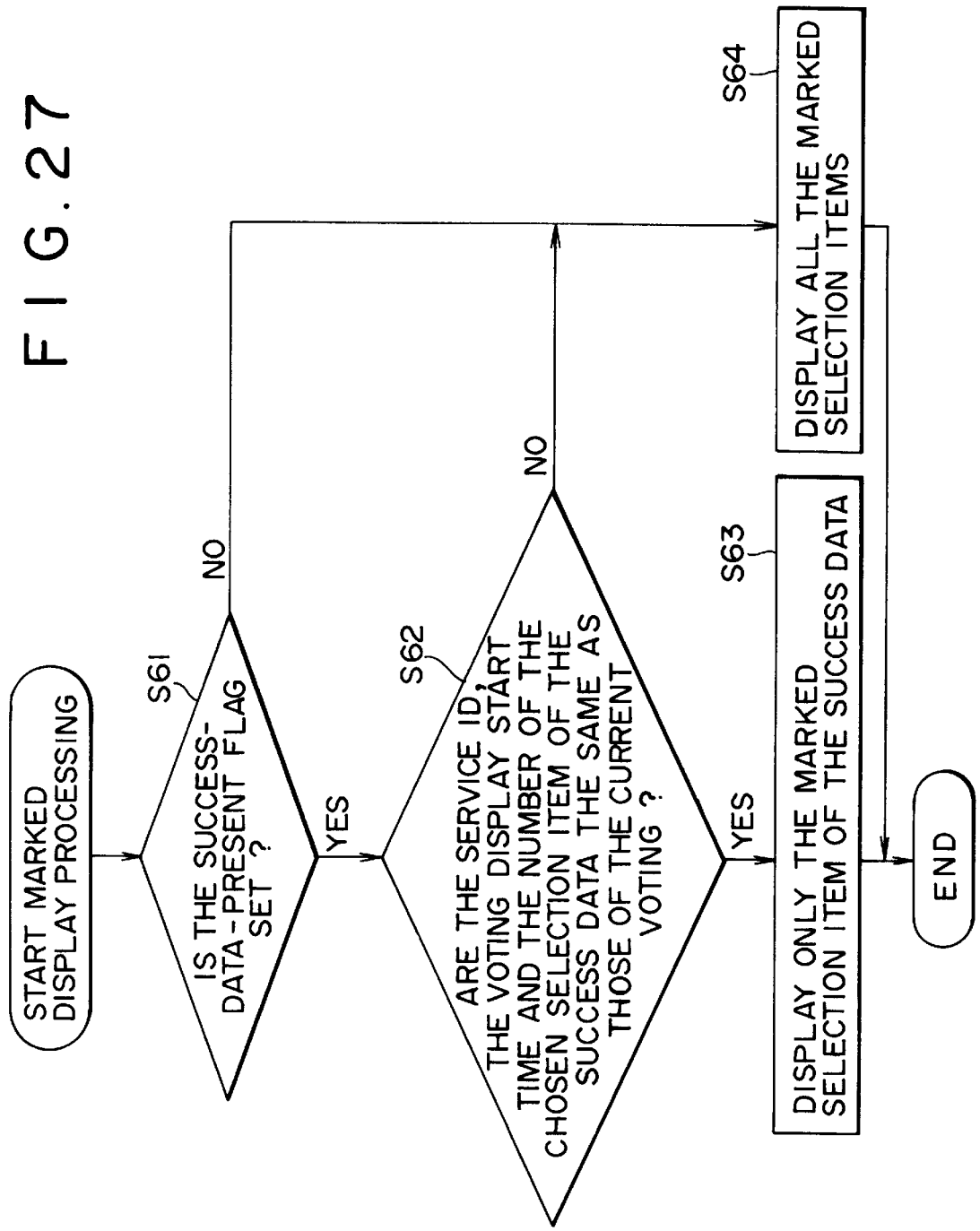

DISPLAY CONTROL METHOD FOR DISPLAY HAVING BUTTONS REPRESENTING SELECTABLE VOTING ITEMS IN WHICH ONLY MARKS ASSIGNED TO SELECTED ITEMS CONTINUE TO BE DISPLAYED UPON SELECTION

BACKGROUND OF THE INVENTION

1. Field of the Invention

In general, the present invention relates to a receiving apparatus and a display control method adopted thereby. In particular, the present invention relates to a receiving apparatus and a display control method adopted thereby wherein select buttons associated with selection voting items are displayed and, when one of the select buttons associated with a particular voting item is specified to choose the particular voting item, the select buttons for the other voting items are deleted, avoiding a further incorrect operation.

2. Description of Related Art

In recent years, experiments of two-way on-line shopping and other activities are under way using systems such as a CATV (Cable Television). In addition, a digital satellite broadcasting system renders services to provide programs which can be accessed by the user interactively by using a telephone line.

Assume that, for example, the user is requested to provide a response to a questionnaire asking which voting item such as commodity or service the user desires. When the user selects one of a plurality of voting items displayed on a monitor screen, for example, an access to a center is made through a telephone line to transmit data pertaining to the selected voting item to the center. With such an interactive operation, carrying out a variety of activities such as voting and shopping is conceivable.

When the user selects one of a plurality of voting items displayed on the monitor screen to transmit data pertaining to the selected voting item to the center but the screen after the voting remains the same as the one prior to the voting, for example, there is raised a problem that, in some cases, the user is confused into thinking that the already selected voting item has not been specified yet, being lead to re-selection of the already chosen voting item.

SUMMARY OF THE INVENTION

Addressing this problem, the present invention prevents such an incorrect operation from being carried out during voting.

BRIEF DESCRIPTION OF THE DRAWINGS

An embodiment of the present invention has been explained with reference to accompanying figures wherein:

FIG. 3 is a diagram showing a typical internal configuration of the IRD 2;

FIG. 5 is a diagram used for explaining a DM_voting_ descriptor;

FIG. 6 is a diagram used for explaining a voting_type;

FIG. 7 shows a flowchart used for explaining the operation of an embodiment shown in FIG. 3;

FIG. 13 is a diagram showing a typical screen displayed at a step S38 of the flowchart shown in FIG. 7;

FIG. 14 is a diagram showing a typical screen displayed at a step S39 of the flowchart shown in FIG. 7;

FIG. 21 is a diagram showing a typical screen displayed at a step S18 of the flowchart shown in FIG. 8;

FIG. 22 is a diagram showing a typical screen displayed at a step S19 of the flowchart shown in FIG. 8;

FIG. 26 is a flowchart showing the flow of message display processing extracted from the processing shown in FIGS. 7 and 8; and FIG. 27 is a flowchart showing the flow of mark display processing extracted from the processing shown in FIG. 8.

DETAILED DESCRIPTION OF THE PREFERRED EMBODIMENT

Figure 1:
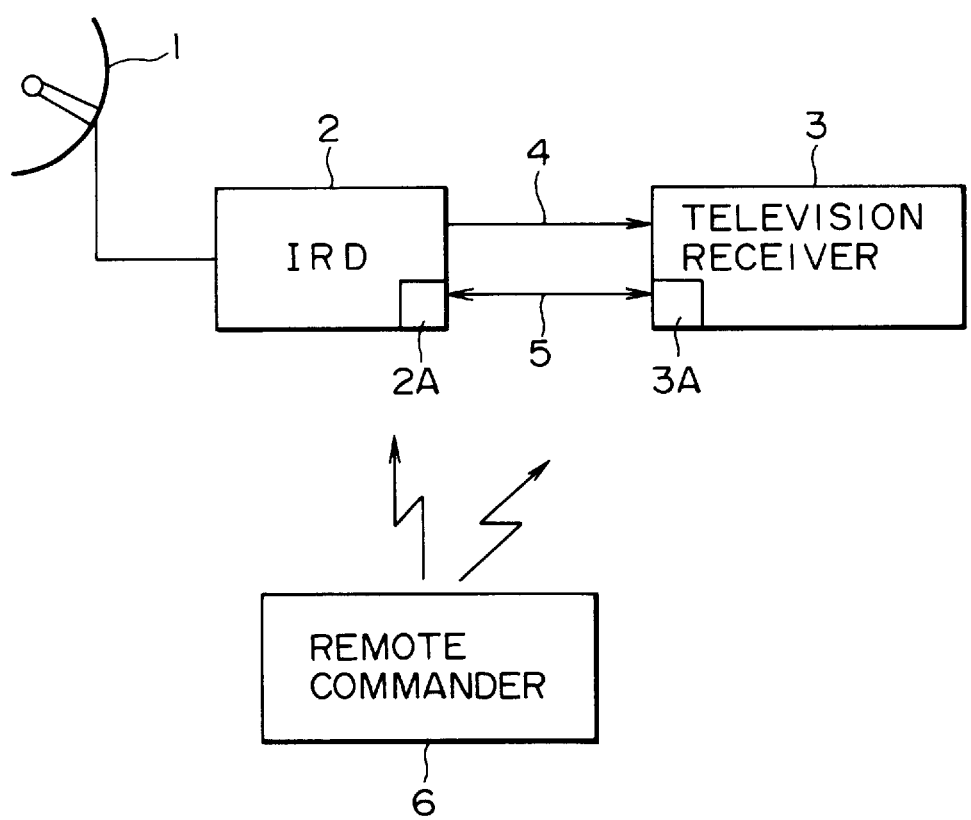
FIG. 1 is a block diagram showing a typical configuration of an AV (Audio/Video) system provided by an embodiment of the present invention.

The present invention will become more apparent from a study of the following detailed description of a preferred embodiment with reference to accompanying diagrams some of which show the embodiment. FIG. 1 is a diagram showing a typical configuration of an AV (Audio/Video) system provided by an embodiment of the present invention. As shown in the figure, the AV system provided by the present embodiment comprises a parabolic antenna 1 for receiving electric-wave signals transmitted by a transmitting apparatus not shown in the figure by way of a broadcasting or communication satellite, an IRD (integrated receiver/decoder) 2 for demodulating the electric-wave signals and a television receiver 3.

Figure 4:
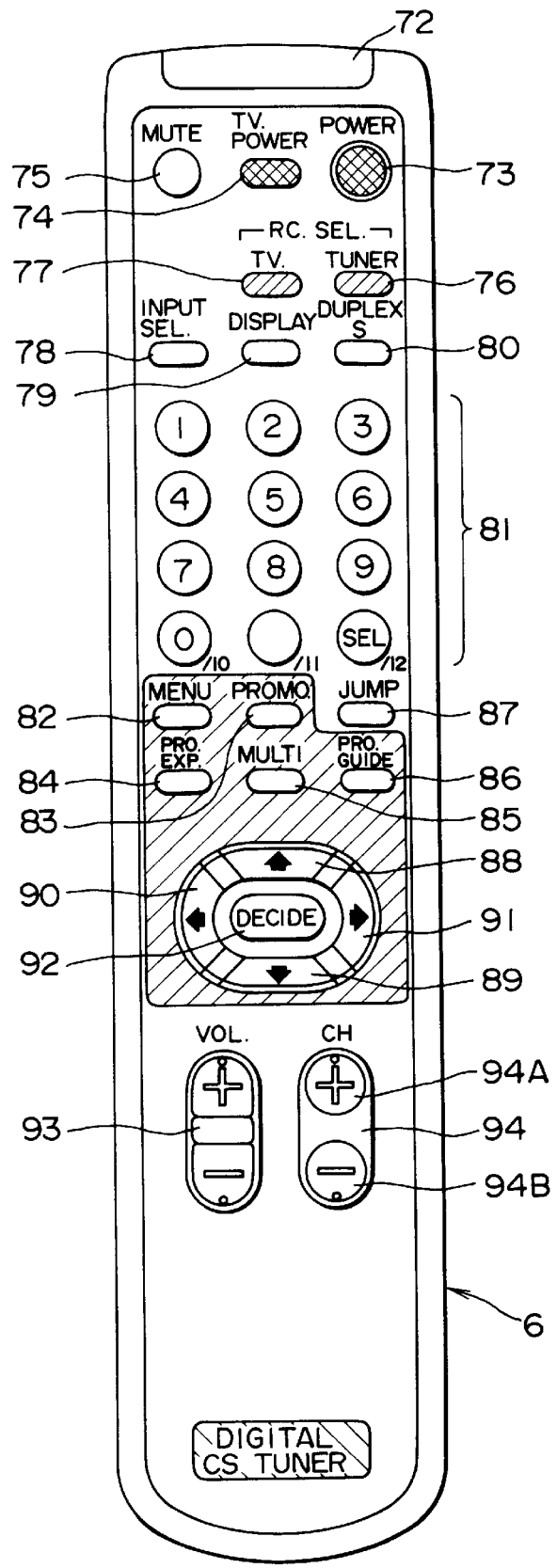
FIG. 4 is a diagram showing a typical configuration of a remote commander 6 employed in the AV system shown in FIG. 1.

The IRD 2 or the television receiver 3 is capable of receiving an IR (infrared) signal transmitted by a remote commander 6 shown in FIG. 4. To put it in detail, when the user operates a switch on the remote commander 6, an IR signal associated with the pressed switch is radiated by an IR-signal generating unit 72 employed in the remote commander 6. The IR signal is then received by an IR-signal receiving unit 39 employed in the IRD 2 shown in FIG. 2.

The IRD 2 supplies a signal output to the television receiver 3 by way of a set of AV lines 4 comprising three lines: a composite video line, an audio L signal line and an audio R signal line. The IRD 2 and the television receiver 3 have an AV-equipment-control-signal transmitting/receiving unit 2A and an AV-equipment-control-signal transmitting/receiving unit 3A respectively. The AV-equipment-control-signal transmitting/receiving unit 2A and the AV-equipment-control-signal transmitting/receiving unit 3A are connected to each other by a control line 5 which is implemented by a wired S1RCS (Sony Infrared Remote Control System), a trademark of Sony Corporation.

Figure 2:
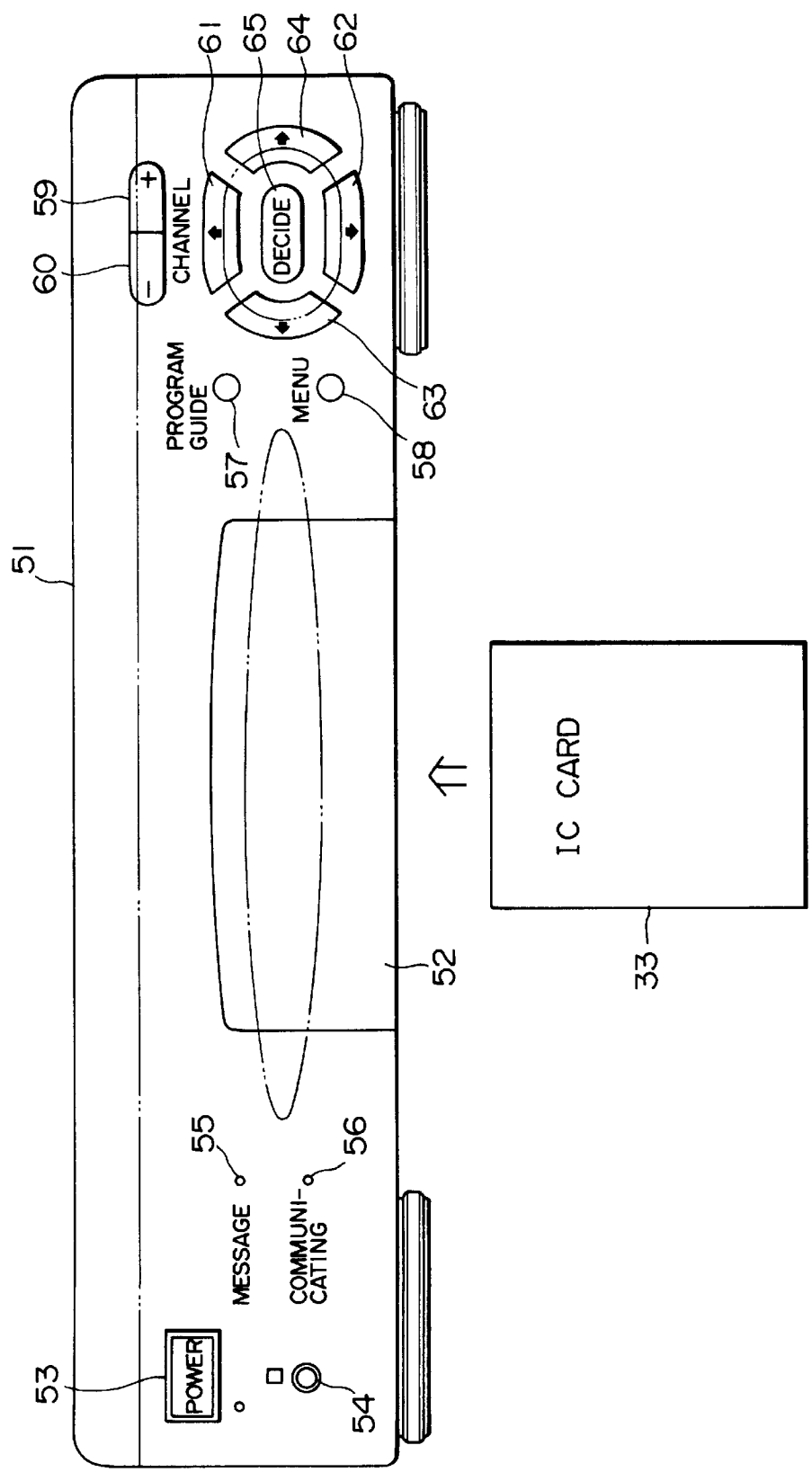
FIG. 2 is a diagram showing a typical configuration of the front view of an integrated receiver/detector (IRD) 2 employed in the AV system shown in FIG. 1.

FIG. 2 is a diagram showing a typical configuration of the front view of the IRD 2. As shown in the figure, installed at the center of a cabinet 51 is a cover 52 which can be opened and closed with ease. An IC card 33 can be inserted into the cabinet 51. On the left side of the IRD 2, a power-supply key 53 is provided. The power-supply key 53 is operated to turn a power supply on and off. Provided beneath the power-supply key 53, an IR-signal receiving unit 54 is used for receiving an IR signal radiated by the remote commander 6.

When a predetermined message is transmitted by way of the satellite to the IRD 2, an LED 55 blinks. The user can let the AV system output the message to the television receiver 3 and display it thereon. As the user acknowledges the message, the LED 55 is turned off. On the other hand, an LED 56 provided beneath the LED 55 is turned on when the IRD 2 is in a state of communication through a telephone line.

A program-guide key 57 and a menu key 58 are operated to display an electronic program guide and a menu respectively on the television receiver 3.

On the circumference of a confirmation key 65, that is, on the top, right, bottom and left sides of the confirmation key 65, an up key 61, a right key 64, a down key 62 and a left key 63 are provided to form a shape like a circle enclosing the confirmation key 65. The up key 61, the right key 64, the down key 62 and the left key 63, which are each referred to hereafter simply as a direction key for the sake of convenience, are operated in order to move a cursor in the upward, right, downward and left directions respectively. On the other hand, the confirmation key 65 is operated to confirm a selected item, that is, to confirm an item indicated by the cursor as a selected item. A channel-up key 59 and a channel-down key 60 are operated to increment and decrement the number of a reception channel respectively by one in one operation.

FIG. 3 is a diagram showing a typical internal configuration of the IRD 2. As shown in the figure, the IRD 2 includes a tuner 21 at a front-end (receiving) assembly 20 for receiving and demodulating an RF signal transmitted by an LNB (low-noise-block) down-converter 1a employed in the parabolic antenna 1. A signal output by the tuner 21 is then supplied to a QPSK-demodulation circuit 22 to undergo QPSK demodulation therein. A signal output by the QPSK-demodulation circuit 22 is then supplied to an error correcting circuit 23 for detecting as well as correcting an error and, if necessary, for compensating the signal supplied thereto for the error.

The IC card 33 which comprises a CPU, a ROM unit and a RAM unit is provided with a necessary key for deciphering enciphered code as well as a deciphering program. When an enciphered signal is received from a satellite, a key and a deciphering process for deciphering the enciphered signal are required. In this case, the key is read out from the IC card 33 and supplied to a demultiplexer 24 by way of a card-reader interface 32. The demultiplexer 24 then deciphers the enciphered signal by using the key.

It should be noted that, in addition to the key and the deciphering program required for deciphering an enciphered signal, service-charge information is also stored in the memory of the IC card 33.

The demultiplexer 24 receives a signal output by the error correcting circuit 23 employed at the front-end assembly 20, temporarily storing the signal in a DRAM (Dynamic Random-Access Memory) or SRAM (Static Random-Access Memory) buffer unit 35. Then, the signal is read out appropriately from the data buffer memory unit 35 to be deciphered. Deciphered digital video and audio signals output by the demultiplexer 24 are then supplied to an MPEG video decoder 25 and an MPEG audio decoder 26 respectively.

The MPEG video decoder 25 appropriately stores the digital video signal received from the demultiplexer 24 in a DRAM unit 25a before executing decode processing on the video signal which has been compressed by an MPEG system. The signal decoded by the MPEG video decoder 25 is then supplied to an NTSC encoder 27 to be converted into a luminance signal Y, a chroma signal C and a composite signal V of the NTSC system. The luminance signal Y and the chroma signal C are each output as an S video signal by way of buffer amplifiers 28Y and 28C respectively. On the other hand, the composite signal V is output to the AV lines 4 by way of a buffer amplifier 28V.

It should be noted that, as the MPEG video encoder 25, an MPEG2 encoding LSI (known as the Sti 3500) manufactured by SGS-Thompson Microelectronics can be used. An outline of the MPEG2 encoding LSI is introduced in documents such as an issue of Nikkei Electronics, amagazine published by Nikkei BP, dated Mar. 14, 1994, No. 603, Pages 101 to 110, authored by Martin Bolton.

As for MPEG2—Transportstream, description can be found on Pages 231 to 253 of a publication with a title "Most Recent MPEG Textbook" issued by ASCII corporation on Aug. 1, 1994.

The MPEG audio decoder 26 appropriately stores the digital audio signal received from the demultiplexer 24 in a DRAM unit: 26a before executing decode processing on the audio signal which has been compressed by an MPEG system. The signal decoded by the MPEG audio decoder 26 is then supplied to a D/A converter 30 for converting the signal into an analog signal. Results of the D/A conversion are an audio signal of the left channel and an audio signal of the right channel which are output to the AV lines 4 by way of a left-channel buffer amplifier 31L and a right-channel buffer amplifier 31R respectively.

An RF modulator 41 converts the composite signal V generated by the NTSC encoder 27 and an audio signal generated by the D/A converter 30 into an output RF signal. In addition, in a TV mode, the RF modulator 41 passes on an RF signal of the NTSC system supplied from an AV apparatus such as a cable box to another AV apparatus such as a VCR (Video Cassette Recorder) uncharged. It should be noted that these AV apparatuses are not shown in the figure.

In the present embodiment, these video and audio signals are supplied to the television receiver 3 by way of the AV lines 4 as described above.

A CPU (Central Processing Unit) 29, which serves as a display control means, a judgment means as well as a control means, carries out a variety of processing by execution of programs stored in the ROM unit 37. As a control means, for example, the CPU 29 controls the operations of components such as the tuner 21, the QPSK-modulation circuit 22 and the error correcting circuit 23. In addition, the CPU 29 also controls the operation of the AV-equipment-control-signal transmitting/receiving unit 2A for outputting predetermined control signals to another AV apparatus, that is, the television receiver 3 in the case of the present embodiment, by way of a control line 5 as well as receiving control signals from the other AV apparatus.

On the other hand, predetermined commands can be directly issued to the CPU 29 by operating a variety of keys provided on a front panel 40 of the IRD 2 shown in FIG. 2. In addition, when the remote commander 6 shown in FIG. 4 are operated, an IR signal is radiated by the IR-signal generating unit 72 employed in the remote commander 6. The IR signal is then received by the IR-signal receiving unit 39 of the IRD 2 and passed on thereby to the CPU 29. As a result, by operating the remote commander 6, a predetermined command can also be issued to the CPU 29 as well.

In addition, besides MPEG video and audio data supplied from the front-end assembly 20, the demultiplexer 24 also takes in information such as EPG (Electrical Program Guide) data and supplies the EPG data to the data buffer memory unit 35 to be stored in an EPG area 35a thereof. The EPG data includes information on programs of broadcast channels for the next 24 hours (such as EPG2 and EPG1-2) or the next 150 hours (such as EPG2, EPG3 and EPG1-2 & EPG1-3) starting from the present time. Since the EPG data is transmitted frequently, the EPG area 35A always contains the most recent EPG data.

An EEPROM (Electrically Erasable Programmable Read-Only Memory) unit 38 is used for appropriately storing data that needs to be retained even after the power supply is turned off. Examples of such data are a record of reception by the tuner 21 for the last four weeks and a last channel, that is, the number of a channel receiving a signal immediately before a predetermined operation is carried out. Such stored data is used for example when it is desired to select the last channel at the time the power supply is turned on. When the last channel is not stored, a channel with the number thereof stored in the ROM unit 37 as a default channel number is typically selected at a power-on time.

In a sleep mode, a minimum number of components such as the front-end assembly 20, the demultiplexer 24 and the data buffer memory unit 35 remain in an active state even if the power supply is turned off. In such a state, the CPU 29 derives the present time from time information included in a received signal, carrying out, among other tasks, control to drive each of the components in an active state to execute predetermined operations at predetermined times. For example, at a predetermined time, the television receiver is connected to a n external VCR in order to carry out timer-based (reservation-based) automatic video recording.

In addition, when it is desired to generate predetermined OSD (On-Screen Display) data, the CPU 29 controls the MPEG video decoder 25. Controlled by the CPU 29, the MPEG video decoder 25 generates the predetermined OSD data, storing the OSD data into an OSD area 25aa of the DRAM unit 25a. The OSD data is then read out from the OSD area 25aa and output to the television receiver 3. In this way, it is possible to display predetermined characters, figures and pictures such as characters, symbols, icons and sub-screens superposed on the ordinary main screen.

The SRAM unit 36 is used as a work memory of the CPU 29. A modem 34, a sort of transmitting/receiving means, is used for transmitting and receiving data to and from a telephone line.

FIG. 4 is a diagram showing a typical configuration of the remote commander 6. As shown in the figure, at the upper-most portion of the remote commander 6, there is provided the IR-signal generating unit 72 for generating IR signals corresponding to operations of a variety of keys provided on the remote commander 6. A power-supply key 73 is operated to turn on and off a power supply of the IRD 2. On the other hand, a television-power-supply key 74 is operated to turn on and off a power supply of the television receiver 3. A mute key 75 is operated to put an audio signal in a mute state or to discontinue a mute state. A switching key 76 is operated when it is desired to remotely control the IRD 2 from the remote commander 6. On the other hand, a switching key 77 is operated when it is desired to remotely control the television receiver 3 from the remote commander 6.

An input switching key 78 is operated to change the input to the IRD 2 or the television receiver 3. A screen-display key 79 is operated to change a state in which characters of a predetermined electronic program guide are displayed on the television receiver 3. A double-audio key 80 is to change an audio channel from one to another in case in which a plurality of channels exist as audio channels.

One of the ten keys 81 is operated to enter a number in the range 0 to 9. The "0" key 81 and a station-select key are operated to enter the number 10 and 12, respectively. A key between the "0" key 81 and the station-select key is operated to enter the number 11.

A menu key 82 is operated to display a menu. A promotion key 83 is operated to display a promotion channel. A program-explanation key 84 is operated to display explanatory information on programs included in the electronic program guide. A multi key 85 is operated to display a shrunk screen of each broadcast channel on the present screen typically as a 4×4 sub-screen in the full screen displaying a currently watched program. In this way, a multi-screen display can be obtained wherein, by changing the number of a channel displayed on the sub-screen, the sub-screen can be used as a kind of electronic program guide for the television watcher. A program-guide key 86 is operated to display an electronic program guide. A jump key 87 is operated to change to the last channel.

An up key 88, a down key 89, a left key 90 and a right key 91 are operated to move the cursor in the upward, downward, left and right directions respectively. These keys are each referred to hereafter simply as a direction key for the sake of convenience. A confirmation key 92 located at the center of the up key 88, the down key 89, the left key 90 and the right key 91 is operated to confirm a selected item, that is, to confirm an item indicated by the cursor as a selected item. A channel-up/down key 94 is operated to increment and decrement the number of a reception channel respectively by one in one operation. The confirmation key 92, the up key 88, the down key 89, the left key 90 and the right key 91 correspond to the confirmation key 65, the up key 61, the down key 62, the left key 63 and the right key 64 provided on the front panel of the IRD 2, receptively, which are shown in FIG. 2. In addition, the layout of the former is also identical with the latter as well. On the other hand, the channel-up/down key 94 corresponds to the channel-up key 59 and the channel-down key 60 shown in FIG. 2.

A volume-up/down key 93 is operated to increase or decrease the volume by a predetermined amount in one operation.

Next, basic operations are explained. When the user operates one of the ten keys 81 of the remote commander 6 to specify the number of a certain channel, an IR signal associated with the operated ten key 81 is radiated by the IR-signal generating unit 72. The IR signal is received by the IR-signal receiving unit 39 employed in the IRD 2. The IR-signal receiving unit 39 supplies the CPU 29 with a signal corresponding to the IR signal. Receiving the signal, the CPU 29 controls the tuner 21 to receive an RF signal of a channel with the number thereof represented by the signal received by the CPU 29.

The tuner 21 demodulates the RF signal of the channel number specified by the CPU 29 from the LNB 1a, outputting the demodulated signal to the QPSK-demodulation circuit 22. A signal completing QPSK demodulation in the QPSK-demodulation circuit 22 is then supplied to the error correcting circuit 23. A signal completing error-correction processing in the error correcting circuit 23 is then supplied to the demultiplexer 24. In the demultiplexer 24, the signal is split into audio and video data which are then supplied to the MPEG audio decoder 26 and the MPEG video decoder 25 respectively. The MPEG video decoder 25 decodes the video data, outputting a decoded signal to the NTSC encoder 27. The NTSC encoder 27 converts the decoded signal supplied thereto into a video signal of the NTSC system. The video signal of the NTSC system is finally supplied to the television receiver 3 by way of the buffer amplifier 28V and the AV line 4 as a composite signal V.

The MPEG audio decoder 26 executes decode processing of the MPEG system on the digital audio signal received from the demultiplexer 24. The signal decoded by the MPEG audio decoder 26 is then supplied to the D/A converter 30 for converting the signal into an analog signal. Results of the D/A conversion are an audio signal of the left channel and an audio signal of the right channel which are output to the AV lines 4 by way of a left-channel buffer amplifier 31L and a right-channel buffer amplifier 31R respectively. The audio signal of the left channel and the audio signal of the right channel are also supplied to the television receiver 3 by way of the AV lines 4. In this way, by operating the remote commander 6, the user can watch the pictures and listen to the sound of a desired program presented through the television receiver 3.

In addition, the demultiplexer 24 supplies EPG data detected from a received signal, if any, to the data buffer memory unit 35 to be stored in the EPG area 35A thereof.

By operating a predetermined key on the remote commander 6, a command to read out the EPG data stored in the EPG area 35A can be issued to the IRD 2. Receiving such a command, the CPU 29 employed in the IRD 2 reads out the EPG data from the EPG area 35A, supplying the EPG data to the MPEG video decoder 25 for converting it into OSD data. The OSD data is then supplied to the NTSC encoder 27 for superposing it on pictures of an ordinary program to be finally output to the television receiver 3.

The following is description of user voting activities such as responding to a questionnaire survey, answering a television-watcher quiz awarding a prize to a winner and shopping by using an interactive program of PerfecTV, a trademark. FIG. 5 shows the structure of a descriptor comprising fields of information each identified by a name including underlines therein. In order to implement such a voting program, a center transmits a DM_voting_ descriptor, an example of the name including underlines, like the one shown in FIG. 5 to the IRD 2. In the IRD 2, the CPU 29 analyzes the DM_voting_descriptor, controlling the MPEG video decoder 25. The MPEG video decoder 25 is requested to generate OSD data to be displayed on the television receiver 3, for example, on a screen like one shown in FIG. 9 to be described later.

It should be noted that the DM_voting_descriptor can be inserted up to 16 times in one program (one event).

A descriptor_tag, another example of the name including an underline shown in FIG. 5, indicates the type of the descriptor. In the case of this example, the descriptor is a voting descriptor. On the other hand, a descriptor_length indicates the length of the descriptor.

A voting_type indicates the type of voting. As shown in FIG. 6, there are four types of voting described below. By the way, FIG. 6 shows information to be transmitted by the IRD 2 to the center which varies from voting type to voting type. It should be noted that, much like the descriptor shown in FIG. 5, each piece of information shown in FIG. 6 is denoted by a name including underlines therein.

Voting of type 1 is voting with no information. That is to say, in this case, the IRD 2 does not transmit any information to the center as shown in FIG. 6. An example of voting of type 1 is a questionnaire survey for collecting information on whether or not a response to the survey is sent from the user.

Voting of type 2 is anonymous voting. In the case of voting of type 2, the IRD 2 transmits a service_id, an event_id, a voting_id and a voting_code shown in FIG. 6 to the center.

A service_id indicates the ID of a channel through which the program is broadcasted and an event_id is the ID of the program. A voting_id represents the ID of the voting whereas a voting_code is the number of a selection item (or a voting item) in the voting.

By the way, anonymous voting can be utilized in a questionnaire survey.

Voting of type 3 is non-anonymous voting. In the case of voting of type 3, the IRD 2 also transmits a CA_system_id and a card_id to the center in addition to the information transmitted in anonymous voting as shown in FIG. 6. A CA_system_id is the ID of a CA (conditional access) system, a party to a contract, and a card_id indicates the ID of the IC card 33.

An example of the non-anonymous voting is a quiz for television watchers which awards a prize to a winner.

Voting of type 4 is protected non-anonymous voting. In the case of voting of type 4, the IRD 2 transmits the same information as the voting of type 3 to the center. In the case of voting of type 3, the length of the voting period (the voting_duration) during which the user can cast a vote is equal to the display_duration of the voting screen. In the case of voting of type 4, on the other hand, the length of the voting_duration may be different from the display_ duration of the voting screen.

An example of the protected non-anonymous voting is shopping.

The voting_id shown in FIG. 5 is a number used for identifying a voting event among a plurality of voting events existing in a program. Up to 16 voting events can exist in a program. Therefore, a voting_id is a number in the range 0 to 15.

A host_number is the number for identifying a host connected to the center rendering voting services among a variety of hosts which are connected to Twin'Et (a trademark). For voting_type=1, this host_number is invalid information.

A start_offset is a period between a point of time the program is started and a point of time the voting is started. As described above, the display_duration and the voting_duration are the display period of a voting screen and a voting period respectively. A voting screen is displayed during a display_duration. The user can cast a vote during a voting_duration.

A voting_name_length is the length of a voting title. The voting title is described by a string of characters following the voting_name_length. A voting_code indicates the code of a selection item (voting item). A tel_number is a telephone number which is to be dialed by the IRD 2 when a selection item is chosen by the user. A code_name_length is the length of the title of a selection item (voting item). The title of a selection item is described by a string of characters following the code_name_length.

Figure 8A:
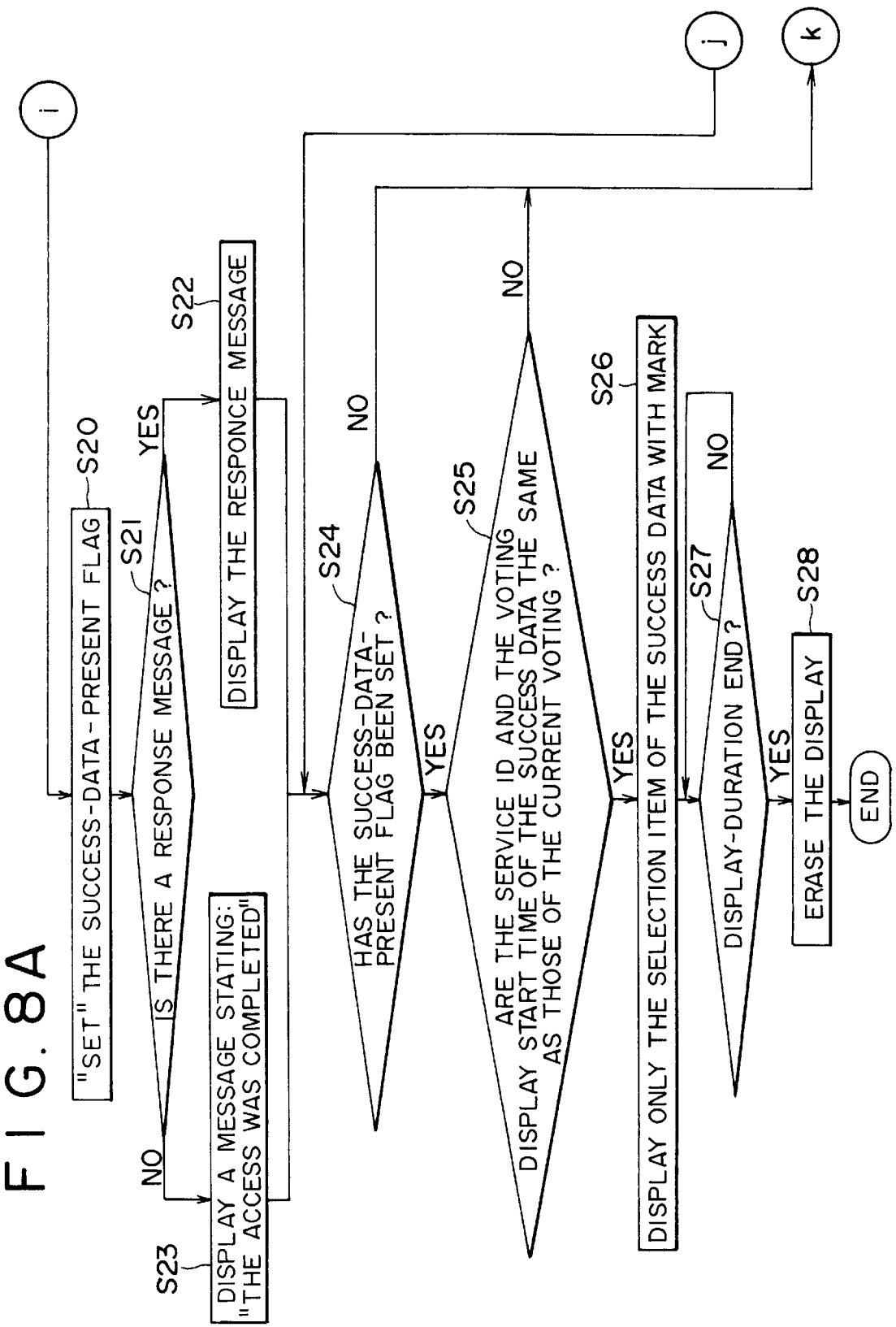
FIG. 8 shows a continuation to the flowchart used for explaining the operation of an embodiment shown in FIG. 3.
Figure 9:
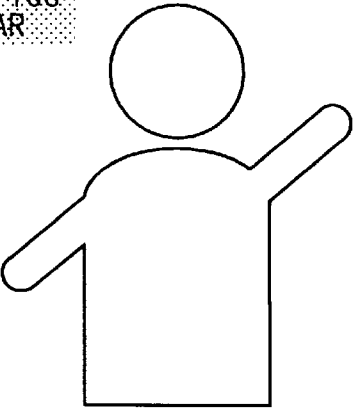
FIG. 9 is a diagram showing a typical screen displayed at a step S1 of the flowchart shown in FIG. 7.

Next, voting processing is explained by referring to FIGS. 7 and 8 which show a flowchart of the voting processing. The flowcharts are executed during a period of time indicated by the voting_duration. As shown in the figures, the flowchart begins with a step S1 at which a selection screen (or a voting screen) is displayed. To put it in detail, the CPU 29 analyzes the DM_voting_descriptor of FIG. 5 which has been received from a center, controlling the MPEG video decoder 25. The MPEG video decoder 25 is requested to generate OSD data. The OSD data is converted by the NTSC encoder 27 into a composite video signal to be displayed on the television receiver 3, for example, on a screen shown in FIG. 9. FIG. 9 is a diagram showing a screen displaying titles of movies which can be selected by the user. The screen shown in FIG. 9 is an example of a display of a voting program. The title of the program is "A Special Program: 1995 Ranking." Displayed below the title of the program is a message typically stating: "Select a button on the screen by operating the remote commander." Displayed further below the message is the voting title (the voting_name described above) : "The Best Ten Programs You Selected for this Year." The voting title is described by a string of characters following the voting_name_length shown in FIG. 5. Below the voting name, a list of 10 movie titles, Title 1 to Title 10, are displayed as selection items (voting items). Titles 1 to 10 are each described by a string of characters following the code_name_length shown in FIG. 5.

In addition, a mark for specifying a selection item is displayed immediately before each of Titles 1 to 10, the 10 selection items, as shown in FIG. 9. In the example of a voting screen shown in FIG. 9, the mark is a rectangular button. The user selects a desired movie title among the ten selection items, Titles 1 to 10, displayed on the screen. A selection item is chosen by placing a cursor (a screen pointer) on the button associated with the chosen selection item by operating the up and down keys 88 and 89 on the remote commander 6. To put it in detail, the cursor can be moved up or down to a desired mark by pressing the up or down key 88 or 89. In the screen shown in FIG. 9, a mark on which the cursor is placed is shown in a black color. In the example shown in FIG. 9, the cursor is currently on the mark of Title 1. In this state, pressing the down key 89 once will move the cursor to the mark of Title 2 and pressing the downkey 89 one more time will move the cursor to the mark of Title 3. When the cursor is placed on the mark of a desired movie title, the user presses the confirmation key 92 on the remote commander 6 to confirm the selection of the movie title.

Each time the user operates the up or down key 88 or 89 or the confirmation key 92, the IR-signal transmitting unit 72 employed in the remote commander 6 transmits an IR signal representing the operated key. The IR signal is received by the IR-signal receiving unit 39 employed in the IRD 2, being converted into a detection signal which is then supplied to the CPU 29. For example, when a signal representing the up or down key 88 or 89 is received, the CPU 29 requests the MPEG video decoder 25 to generate OSD data for the cursor in accordance with the operation of the key.

The flow of processing shown in FIG. 7 goes on from the step S1 to a step S2 at which the CPU 29 gets in a state waiting for the confirmation key 92 to be operated. As the confirmation key 92 is operated by the user as described above, the flow of processing proceeds to a step S3 at which the CPU 29 reads out the voting_type from the descriptor of FIG. 5 received from the center in order to determine the type of voting of the voting screen shown in FIG. 9. As described above, there are four types of voting. If the voting is found to be of type 1 or 2, the flow continues to a steps 4. If the voting is found to be of type 3 or 4, on the other hand, the flow continues to a steps 29.

At the steps 29, the CPU 29 detects whether or not an IC card 33 has been mounted on the card-reader interface 32 employed in the IRD 2. This is because voting of type 3 or 4 is non-anonymous voting which requires an IC card 33. If an IC card 33 has been mounted, the card-reader interface 32 notifies the CPU 29 of the existence of the IC card 33. Notified by the card-reader interface 32, the CPU 29 can thus detects whether or not an IC card 33 has been mounted on the card-reader interface 32.

Figure 10:
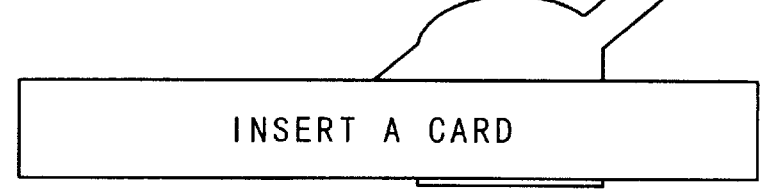
FIG. 10 is a diagram showing a typical screen displayed at a step S30 of the flowchart shown in FIG. 7.

If an IC card 33 yet been mounted on the card-reader 32 employed in the IRD 2, the flow of processing goes on to a steps 30 at which the CPU 29 displays a message typically stating: "Insert a card" on the television receiver 3 on a screen like the one shown in FIG. 10. Then, the flow of processing proceeds to a step S31 at which the CPU 29 detects whether or not a five-second time-out has occurred, or whether or not the user has opened the cover 52 of the IRD 2. If the five-second time-out occurs before the cover 52 is opened, the flow of processing returns to the step S1 to repeat the processing.

Figure 11:
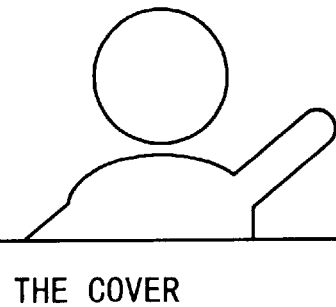
FIG. 11 is a diagram showing a typical screen displayed at a step S32 of the flowchart shown in FIG. 7.

If it is detected that the cover 52 has been opened, on the other hand, the flow of processing continues to a step S32 at which the CPU 29 displays a message stating: "Close the cover" on the television receiver 3 on a screen like the one shown in FIG. 11. The continuation of the processing flow to the step S32 indicates that, in response to the message stating: "Insert a card" displayed on the screen at the step S30, the user opened the cover 52 and mounted an IC card 33 on the IRD 2. The flow of processing then goes on to the step S32 at which the CPU 29 displays the message stating: "Close the cover" on the screen. The flow of processing then proceeds to a step S33 at which the CPU 29 gets in a state waiting for the user to close the cover 52. In response to the message stating: "Close the cover," the user closes the cover 52. As the cover 52 is closed, the flow of processing returns to the step S1 to repeat the processing.

Figure 12:
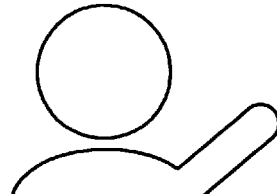
FIG. 12 is a diagram showing a typical screen displayed at a step S35 of the flowchart shown in FIG. 7.

If it is detected at the step S29 that an IC card 33 has been inserted, on the other hand, the flow of processing continues to a step S34 at which the CPU 29 detects whether or not the mounted IC card 33 is a right one. With an IC card 33 mounted on the IRD 2, the CPU 29 communicates with the IC card 33 through the card-reader interface 32 to determine whether or not the mounted IC card 33 is a correct one. If the IC card 33 is found correct, the CPU 29 can communicate normally with the IC card 33 through the card-reader interface 32. In this case, the flow of processing goes on to a step S36. If the IC card 33 is not a correct one, on the other hand, the CPU 29 can not communicate normally with the IC card 33. In this case, the flow of processing goes on to a step S35 at which the CPU 29 displays a message typically stating: "An access can not be made with the card. Check whether or not a correct card has been inserted. An inquiry can be made to PerfecTV." on the television receiver 3 for ten seconds on a screen like the one shown in FIG. 12. In response to this message, the user replaces the mounted IC card 33 with a correct one. If a ten-second period of time lapses after the issuance of the message, the flow of processing returns to the step S1 to repeat the processing.

As described above, if it is detected at the step S34 that the IC card 33 mounted on the IRD 2 is a correct one, the flow of processing continues to the step S36 at which the CPU 29 detects whether the voting is of type 4. If the voting is of type 4, the flow of processing goes on to a step S37 at which the CPU 29 detects whether or not the setting of a password has been done because in order to carry out voting of type 4, a password is required. If a password has not been set yet, the flow of processing proceeds to a step S38 at which the CPU 29 displays a message typically stating: "A password is required. Set a password using a television-watcher-age-limit setting of an initialization of the menu." on the television receiver 3 on a screen like the one shown in FIG. 13. In response to this message, the user moves the cursor to a button on the television receiver 3 marked with the characters "OK" then operates the confirmation key 92. Then, the user operates the menu key 82 to have a menu screen displayed. In accordance with the message displayed at the step S38, the user then selects an initialization item from the displayed menu. The user further selects a 'television-watcher-age-limit setting' sub-item from the selected 'initialization' item, carrying out an operation to catalog a password. When a password is entered by the user, the password is recorded in the IC card 33.

If the OK button is selected at the step S38, the flow of processing returns to the step S1 to repeat the processing. The processing flow also returns to the step S1 to repeat the processing if a 30-second time lapses after the issuance of the message even if the OK button is not selected.

If it is detected at the step S37 that the setting of a password has been done, that is, if the CPU 29 is notified by the IC card 33 through the card-reader interface 32 that a password has been cataloged therein, on the other hand, the flow of processing continues to a step S39 at which the CPU 29 displays a message typically stating: "Press the confirmation button in order to make an access. Then, enter a password by pressing the numeric buttons." on the television receiver 3 on a screen like the one shown in FIG. 14. In addition to the message, the CPU 29 also displays an entry for displaying a password being entered by the user and a button marked with a string of characters 'cancel' at the same time. In accordance with the message, the user operates the ten (numeric) keys 81 on the remote commander 6 to enter a password, or selects the cancel button.

Figure 15:
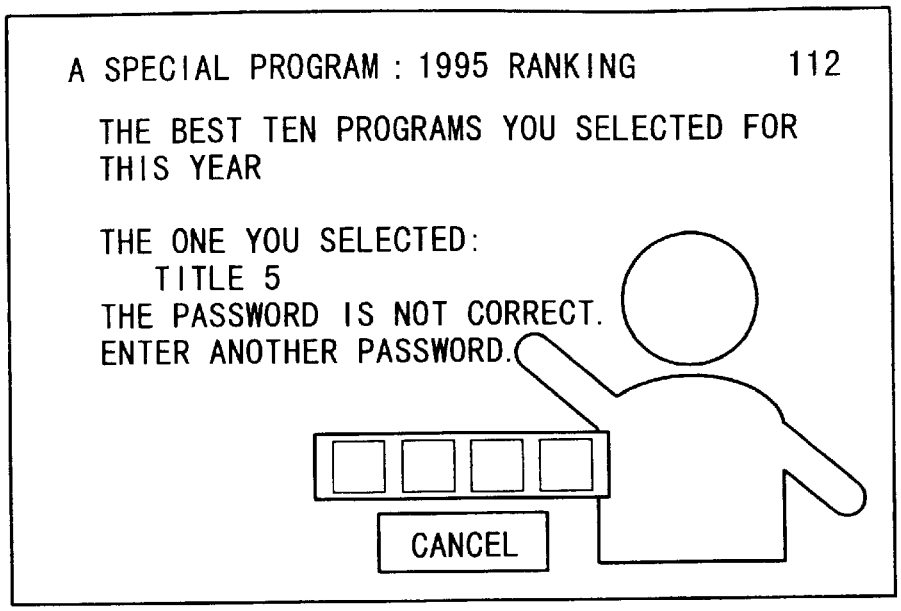
FIG. 15 is a diagram showing a typical screen displayed at a step S42 of the flowchart shown in FIG. 7.

Then, the flow of processing goes on to a step S40 at which the CPU 29 detects whether the cancel button was selected or a password was entered at the step S39. If the cancel button was selected, the flow of processing returns to the step Si to repeat the processing. If it is detected at the step S40 that a password was entered, on the other hand, the flow of processing goes on to a step S41 at which the CPU 29 detects whether or not the password is a correct one. To put it in detail, the CPU 29 supplies the entered password to the IC card 33 by way of the card-reader interface 32. The IC card 33, in turn, detects whether or not the entered password is the same as the password cataloged therein. The result detected by the IC card 33 is communicated to the CPU 29 by way of the card-reader interface 32. The CPU 29 then detects whether or not the password is a correct one based on the result detected from the IC card 33. If the entered password is found incorrect, the flow of processing goes on to a step S42 at which the CPU 29 displays a message typically stating: "The password is not correct. Enter another password." on the television receiver 3 on a screen like the one shown in FIG. 15. In addition to the message, the CPU 29 also displays the entry for displaying a password being entered by the user and the cancel button at the same time. The flow of processing then returns to the step S40 at which the CPU 29 similarly detects whether the cancel button was selected or a password was entered at the step S42.

If it is detected at the step S41 that the entered password is correct, the flow of processing goes on to a step S4. It should be noted that the flow of processing also proceeds to the step S4 from the step S36 if it is detected at the step S36 that the voting is not of type 4.

At the step S4, the CPU 29 detects whether or not a pending previous access remains to be made again. As will be described in detail later, a pending previous access remains to be completed when the user made an attempt to cast a vote in previous voting but the voting could not be completed for some reasons such as the fact that the telephone line of the vote receiving center was busy or the telephone line of the user itself was busy. If the previous voting is of type 1, 2 or 3, the user is just allowed to merely cast a vote again, starting from the beginning as is the case with steps S15 and S19 to be described later. If the previous voting is of type 4, however, the essentials of the voting are stored in the EEPROM unit 38 since voting of type 4 is important voting as is the case with steps S10, S16 and S18 to be described later. In this case, it is necessary to make an access again for the pending previous voting. It is thus necessary to detect whether the access to be made this time is an access for the previous voting or the current voting. At the step S4, the CPU 29 detects whether or not pending previous voting of type 4 remains to be completed.

Figure 16:
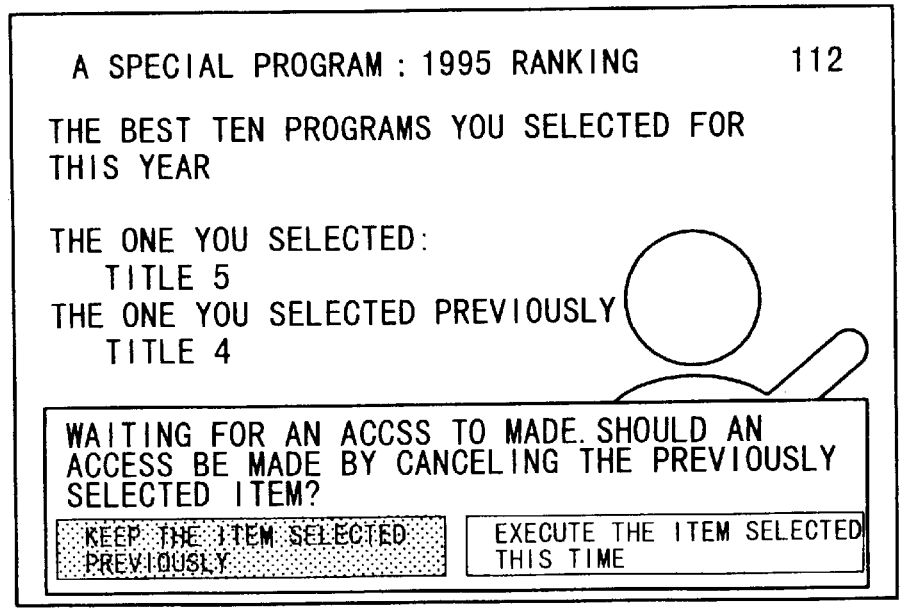
FIG. 16 is a diagram showing a typical screen displayed at a step S7 of the flowchart shown in FIG. 7.

If it is detected at the step S4 that pending previous voting of type 4 remains to be completed, the flow of processing goes on to a step S7 at which the CPU 29 displays a message on a screen on the television receiver 3 like the one shown in FIG. 16.

To put it in detail, the CPU 29 displays the selection items chosen in both the current voting and the pending previous voting. In an example shown in FIG. 16, the selection item chosen in the current voting is a movie with Title 5 and the selection item chosen in the previous pending voting is a movie with Title 4.

In addition to the movie titles, the CPU 29 also displays a message typically stating: "Waiting for an access to be made. Should an access be made by canceling the previously selected item?" on a screen on the television receiver 3 like the one shown in FIG. 16. The CPU 29 also displays buttons marked with phrases saying: "Keep the item selected previously" and "Execute the item selected this time". The user then operates the left or right key 90 or 91 on the remote commander 6 to move the cursor to the left or right, placing the cursor on either of the displayed buttons. Then, the user operates the confirmation key 92 to confirm the selection of the button.

The flow of processing then goes on to a step S8 at which the CPU 29 detects whether the button marked with the phrase saying: "Keep the item selected previously" or "Execute the item selected this time" was selected by the user at the step S7. If it is detected that the button marked with the phrase saying: "Keep the item selected previously" was selected, the flow of processing returns to the step S1 to repeat the processing. In this case, the previous voting screen is displayed again and the user carries out the access processing again, starting from the voting screen.

If it is detected at the step S4 that no pending previous voting of type 4 remains to be completed, on the other hand, the flow of processing goes on to a step S5 at which the CPU 29 displays an inquiry saying: "Should the access be executed? on a screen on the television receiver 3 like the one shown in FIG. 17. At the same time, the CPU 29 also displays buttons marked with character strings "Cancel" and "Execute". The user then operates the left or right key 90 or 91 on the remote commander 6 to move the cursor to the left or right, placing the cursor on either of the displayed buttons. Then, the user operates the confirmation key 92 to confirm the selection of the button.

The flow of processing then goes on to a step S6 at which the CPU 29 detects whether the button marked with the string of characters: "Cancel" or "Execute" was selected by the user at the step S5. If it is detected that the button marked with the string of characters: "Execute" was selected, the flow of processing returns to the step S1 to repeat the processing.

If it is detected at the step S6 that the button marked with the string of characters: "Cancel" was selected at the step S5, on the other hand, the flow of processing goes on to a step S9. It should be noted that the flow of processing also continues from the step S8 to the step S9 if it is detected at the step S8 that the button marked with the phrase saying: "Execute the item selected this time" was selected by the user at the step S7.

Figure 18:
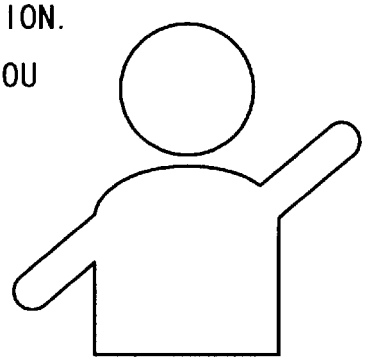
FIG. 18 is a diagram showing a typical screen displayed at a step S9 of the flowchart shown in FIG. 7.

At the step S9, the CPU 29 displays a message typically stating: "An access is being made. Wait without carrying out any operation." on the television receiver 3 on a screen like the one shown in FIG. 18.

The flow of processing then proceeds to the step S10 cited earlier at which the CPU 29 stores success data in the EEPROM unit 38. The success data includes the service_id (the channel number) of the voting program, the start_offset of the voting (that is, a period between a point of time the program is started and a point of time the voting is started) and the voting_code of the selected voting item (the number of the voting item)

Then, the flow of processing goes on to a step S11 at which the CPU 29 clears (resets) the success-data-present flag. The flag is reset to prepare for a case in which, as a result of an attempt made to execute the access at the next step S12, the voting can not be completed because the telephone line of the vote receiving center is busy or the telephone line of the home of the user itself is busy. If the voting can be accomplished, on the other hand, the flag is set at a step S20 after the step 12 as will be described later.

The flow of processing then continues to a step S12 at which the CPU 29 carries out access processing. To put it in detail, the CPU 29 controls the modem 34, starting an access operation by dialing the telephone number specified in the tel_number in order to transmit a voting_code selected by the user. Controlled by the CPU 29, the modem 34 starts to make a call to the specified phone number. As telephone-line connection with the vote receiving center (the center in this case) is established, the CPU 29 transmits transmission information shown in FIG. 6 in accordance with the type of the voting.

To put in detail, for voting with a voting_type of 1, no information is transmitted in particular. In the case of voting with a voting_type of 2, a service_id, an event_id, a voting_id and a voting_code are transmitted to the center. As for voting with a voting_type of 3 or 4, a CA_system_id and a card_id are transmitted in addition to the information transmitted in the case of voting with a voting_type of 2.

As a result, at the center, the presence or absence of a vote can be used to derive the total number of votes in the case of voting with a voting_type of 1. In the case of voting with a voting_type of 2, the center can calculate the total number of votes for each channel, each program, each voting and each voting item. For voting with a voting_type of 3 or 4, the center can further obtain, among other data, information on the user participating in the voting and the contract condition.

Then, the flow of processing goes on to a step S13 at which the CPU 29 detects whether the voting was accomplished. In case the voting could not be accomplished, the cause is identified. The cause can be a busy telephone line of the vote receiving center, a busy telephone line of the home of the user itself or a connection problem on the telephone line.

Figure 19:
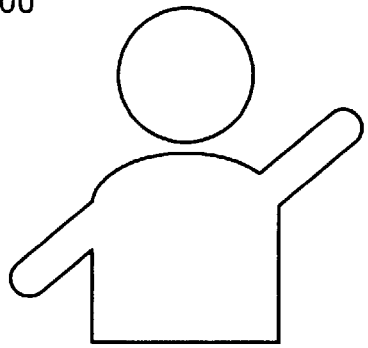
FIG. 19 is a diagram showing a typical screen displayed at a step S15 of the flowchart shown in FIG. 8.
Figure 20:
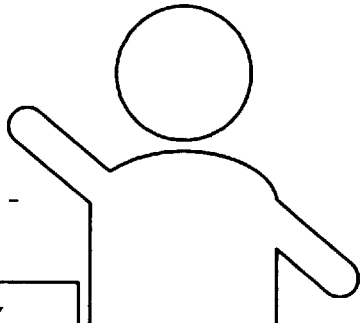
FIG. 20 is a diagram showing a typical screen displayed at a step S16 of the flowchart shown in FIG. 8.

If the voting could not be accomplished because the telephone line of the vote receiving center (the center) is busy, the flow of processing continues to a step S14 at which the CPU 29 detects whether or not the current voting is of type 4. If the current voting is not of type 4, that is, if the current voting is of type 1, 2 or 3, the flow of processing proceeds to a step S15 at which the CPU 29 displays a message typically stating: "An access failure. Please try once more." on the television receiver 3 for five seconds on a screen like the one shown in FIG. 19. If the current voting is of type 4, on the other hand, the flow of processing proceeds to a step S16 at which the CPU 29 displays a message typically stating: "An access failure." and a message typically stating: "This access can be re-tried as a center access related to programs of the menu." on the television receiver 3 for 30 seconds on a screen like the one shown in FIG. 20.

In response to the message displayed at the step S16, the user selects a menu item and then selects a 'program related' item from the menu. Then, the user further selects a 'center access' sub-item from the 'program related' item. These sequential selection operations cause the CPU 29 to read out the success data stored at the step S10 in the EEPROM unit 38 and carry out access processing for the success data. In this way, the user can make an access again based on the selection already carried out before without the need to repeat the selection processing.

That is to say, in the case of voting of type 4, the voting_duration is not the same as the display_duration. In other words, the user can cast a vote even after the display_duration has expired. As described above, the voting can be carried out by selecting a menu item then selecting a 'program related' item from the menu before further selecting a 'center access' sub-item from the 'program related' item as described above.

If it is detected the step S13 that the voting could not be accomplished because the telephone line of the home of the user itself is busy, on the other hand, the flow of processing proceeds to a step S17 at which the CPU 29 detects whether or not the current voting is of type 4. If the current voting is of type 4, the flow of processing proceeds to a step S18 at which the CPU 29 displays a message typically stating: "An access failure. The telephone line is busy or not connected correctly." and another message typically stating: "This access can be re-tried as a center access related to programs of the menu" on the television receiver 3 for 30 seconds on a screen like the one shown in FIG. 21. If the current voting is not of type 4, that is, if the current voting is of type 1, 2 or 3, on the other hand, the flow of processing proceeds to a step S19 at which the CPU 29 displays a message typically stating: "An access failure. The telephone line is busy or not connected correctly." on a screen on the television receiver 3 for five seconds like the one shown in FIG. 22. It should be noted that, in response to the message displayed at the step S18, the user can carry out the same operations as those performed in response to the message displayed at the step S16.

Figure 23:
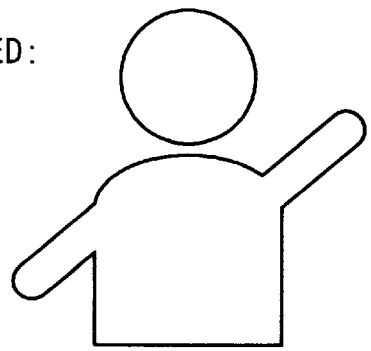
FIG. 23 is a diagram showing a typical screen displayed at a step S22 of the flowchart shown in FIG. 8.

If it is detected at the step S13 that the voting was accomplished, that is, if the information could be transmitted to the vote receiving center, on the other hand, the flow of processing goes on to a step S20 at which the CPU 29 sets the success-data-present flag which was cleared at the step S11 as described earlier. Then, the flow of processing continues to a step S21 at which the CPU 29 detects whether or not a response message was received from the center. If a response message is found received, the flow of processing goes on to a step S22 at which the CPU 29 displays the response message on a screen on the television receiver 3 for ten seconds like the one shown in FIG. 23. Typically, the response message states: "Thank you for your participation." as is the case with the example shown in FIG. 23.

Figure 24:
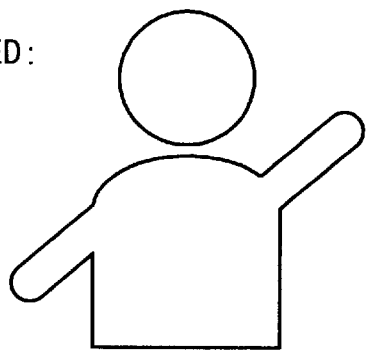
FIG. 24 is a diagram showing a typical screen displayed at a step S23 of the flowchart shown in FIG. 8.

If a response message was not received, on the other hand, the flow of processing goes on to a step S23 at which the CPU 29 displays a message typically stating: "The access was completed" for five seconds on a screen on the television receiver 3 like the one shown in FIG. 24.

With the response message displayed at the step S22, the message typically stating: "The access was completed" displayed at the step S23 or the message typically stating: "An access failure" displayed at the step S15, S16, S18 or S19, the display_duration expires after a five-second time has lapsed since the issuance of the message and the CPU 29 erases the display screen. If the five-second time has not lapsed yet since the issuance of the message, on the other hand, the CPU 29 gets in a state waiting for the five-second time to lapse before erasing the display screen. In this way, the message is displayed for at least five seconds.

After a ten-second time has lapsed since the issuance of the response message or a five-second time has lapsed since the issuance of the message stating: "The access was completed", the flow of processing goes on to a step S24. It should be noted that the flow of processing also goes on to the step S24 from the step S15 or the step S19 after a five-second time has lapsed since the issuance of the message stating: "An access failure," or from the step S16 or the step S18 after a 30 second time has lapsed since the issuance of the message stating: "An access failure."

At the step S24, the CPU 29 finds out whether or not the success-data-present flag has been set. A reset success-data-present flag indicates an access failure, making it necessary to try the access again. In this case, the flow of processing thus returns to the step S1 to repeat the processing.

If the success-data-present flag is found set by the CPU 29 at the step S24, on the other hand, the flow of processing goes on to a step S25 at which the CPU 29 detects whether or not the service_id and the start_offset included in the success data stored in the EEPROM unit 38 at the step S10 match the service_id and the start_offset of the voting at the present point of time. A service_id included in the success data not matching the service_id of the voting at the present point of time indicates that the stored success data is data of a different program (a different channel). Even if the service_id included in the success data matches the service_id of the voting at the present point of time, a start_offset included in the success data not matching the start_offset of the voting at the present point of time indicates that the stored success data is data of previous voting. In such cases, the flow of processing returns to the step S1 to repeat the processing.

Figure 25:
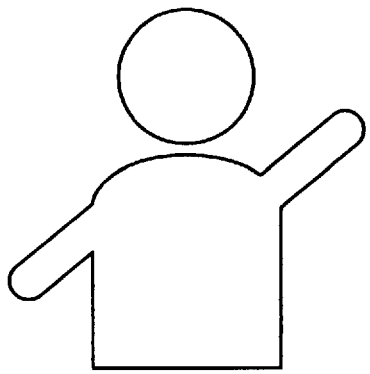
FIG. 25 is a diagram showing a typical screen displayed at a step S26 of the flowchart shown in FIG. 8.

The judgment of the step S25 is formed to determine whether or not voting carried out by the user to the stage at which the success-data-present flag for the voting is set is still under way. If the user carried out the voting operation during a period specified by the voting_duration, the service_id and the start_offset included in the success data match the service_id and the start_offset of the voting at the present point of time. In this case, the flow of processing goes on to a step S26 at which the CPU 29 displays the voting items (selection items) with a mark added only to the chosen one included in the success data as shown in FIG. 25. Other voting items are each displayed with no mark added thereto. In the example shown in FIG. 25, only Title 5 is displayed with a mark put thereon. The other selection items, that is, Titles 1 to 4 and Titles 6 to 10, are each displayed with no mark added thereto. When compared with the display shown in FIG. 9, the display of FIG. 25 has no mark except Title 5. From the screen of FIG. 25, the user can thus recognize intuitively that the voting has been finished so that the user can not cast a vote anymore.

Then, the flow of processing goes on to a step S27 at which the CPU 29 gets in a state waiting for the display_duration to expire. As the display_duration expires, the flow of processing proceeds to a step S28 at which the CPU 29 erases the voting screen, ending the processing.

If the voting_duration expires, allowing next voting (voting with a different voting_id) to be started before the screen of FIG. 25 is displayed but after the user has cast a valid vote, the service_id and the start_offset included in the success data will not match the service_id and the start_offset of the next voting. In this case, displaying the screen of the previous voting like the one shown in FIG. 25 will lead the user to a misunderstanding. Thus, in this case, the flow of processing returns to the step S1 at which the CPU 29 displays a voting screen for the next voting.

At the step S25, as an alternative, the CPU 29 can detect whether or not new voting has been started by comparing the service_id and the voting_id of the success data with those of the voting at the current point of time. If the voting_id is compared, however, there may be different programs with the same service_id and the same voting_id. It is thus necessary to also compare the event_id (the program ID). As a result, not only is the number of items to be compared large, but it is also quite within the bounds of possibility that the event_id is used repeatedly a number of times when there are a number of programs in the same channel. In this case, it is feared that the same voting_id and the same event_id are assigned to different voting events. On the other hand, the probability that the start_offset varies from program to program is high. Thus, by comparing the service_id and the start_offset, particular voting can be identified unequivocally.

Figure 17:
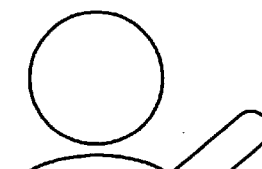
FIG. 17 is a diagram showing a typical screen displayed at a step S5 of the flowchart shown in FIG. 7.

It should be noted that, with the screen of FIG. 13 displayed at the step S38, the screen of FIG. 14 displayed at the step S39, the screen of FIG. 17 displayed at the step S5 or the screen of FIG. 16 displayed at the step S7, the display_duration may expire. In this case, the CPU 29 typically displays a status message for example stating: "Since the valid period has expired, the voting can not be carried out" on a screen on the television receiver 3 and then gets in a state waiting for five seconds to lapse before erasing the display of the voting screen.

Message display processing and mark display processing of the flowchart shown in FIGS. 7 and 8 which are carried out after the user casts a vote are extracted from the flowchart and shown in FIGS. 26 and 27 respectively.

A flowchart shown in FIG. 26 begins with a step S51 at which the CPU 29 carries out processing to store success data. This processing corresponds to the processing carried out at the step S10 shown in FIG. 7. As described earlier, the success data includes the service_id and the start_offset of the voting being accessed in addition to the voting_code of the selected voting item.

The flow of processing then goes on to a step S52 at which the CPU 29 resets the success-data-present flag. This processing corresponds to the processing carried out at the step S11 shown in FIG. 7. Next, the flow of processing proceeds to a step S53 at which the CPU 29 carries out processing corresponding to the success data stored at the step S51. This access execution processing corresponds to the processing carried out at the step S12 shown in FIG. 8.

The flow of processing then continues to a step S54 at which the CPU 29 gets in a state waiting for the access to be completed. Then, the flow of processing goes on to a step S55 at which the CPU 29 detects whether or not the access was successful. The processing carried out at the steps S54 and S55 correspond to the processing carried out at the step S13 shown in FIG. 8.

If the access is found successful at the step S55, the flow of processing proceeds to a step S56 at which the CPU 29 sets the success-data-present flag. The processing carried out at the step S56 corresponds to the processing carried out at the step S20 shown in FIG. 8. The flow of processing then goes on to a step S57 at which the CPU 29 carries out success-message display processing. The processing carried out at the step S57 corresponds to the processing carried out at the steps S22 and S23 shown in FIG. 8.

If the access is found unsuccessful at the step S55, on the other hand, the flow of processing proceeds to a step S58 at which the CPU 29 carries out failure-message display processing. The processing carried out at the step S58 corresponds to the processing carried out at the steps S15, S16, S18 and S19 shown in FIG. 8.

On the other hand, the mark display processing shown in FIG. 27 begins with a step S61 at which the CPU 29 detects whether or not the success-data-present flag has been set. The processing carried out at the step S61 corresponds to the processing carried out at the step S24 shown in FIG. 8. If the success-data-present flag has been set, the flow of processing goes on to a step S62 at which the CPU 29 detects whether or not the service_id and the start_offset included in the success data match the service_id and the start_offset of the voting at the present point of time. The processing carried out at the step S62 corresponds to the processing carried out at the step S25 shown in FIG. 8. If voting has not been started after the voting for which the success data was stored, that is, if the service_id and the start_offset included in the success data match the service_id and the start_offset of the voting at the present point of time, the flow of processing goes on to a step S63 at which the CPU 29 displays the voting items (selection items) with a mark added only to the chosen one included in the success data. Other voting items are each displayed with no mark added thereto. As a result, a screen like the one shown in FIG. 25 is displayed. The processing carried out at the step S63 corresponds to the processing carried out at the step S26 shown in FIG. 8.

If the success-data-present flag is found reset at the step S61 or the next voting is found started at the step S62, on the other hand, the flow of processing goes on to a step S64 at which the CPU 29 displays all voting items each with a mark appended thereto. As a result, a screen like the one shown in FIG. 9 is displayed. The processing carried out at the step S64 corresponds to the processing carried out at the step S1 shown in FIG. 7.

In this way, carrying out control as to whether or not a mark is to be displayed at the beginning of a selection item makes it possible for the user to clearly distinguish a screen for voting from a screen not for voting. As a result, the user is capable of recognizing whether or not voting has already been completed with ease, avoiding an incorrect operation such as a re-access which is inadvertently made to choose the same selection item in spite of the fact that voting has been completed.

It should be noted that, while the present invention has been described with reference to an illustrative embodiment wherein a predetermined mark is displayed on a screen on the television receiver 3 at the beginning of each selection item and, upon a successfully completed access to a center, only the mark of the chosen selection item is displayed, erasing the marks of other selection items, the description is not intended to be construed in a limiting sense. That is to say, it is to be understood that the subject matter encompassed by the present invention is not limited to the embodiment. For example, instead of erasing the marks of selection items other than the chosen one, it is possible to change the color or the shape of only the mark of a chosen selection item in order to allow the user to recognize that the voting has been completed. In short, any technique can be adopted as long as the technique makes a state upon completion of voting different from a state prior to the voting.

In addition, the embodiment has been explained by taking PerfecTV programs as examples. It is worth noting, however, that the scope of the present invention is not limited to PerfecTV programs. Instead, the present invention can also be applied to programs of other digital satellite broadcasting systems and a CATV.

According to the present invention, when a voting item is selected, a mark display state upon completion of voting is made different from a mark display state prior to the voting. As a result, the user is capable of recognizing whether or not voting has already been completed with ease, avoiding an incorrect operation.

What is claimed is:

1. A display control method for displaying a voting screen of a program on a receiving apparatus for receiving a video signal conveying said program, said display control method comprising the steps of:

controlling a display means to display pictures of a plurality of voting items of said program and a plurality of marks each associated with one of a plurality of voting items of said program;

transmitting a selected-item information signal conveying information on a selected one of said voting items upon selection of said selected one of said voting items;

detecting whether said selected-item information signal has been successfully transmitted; and displaying only one of said marks associated with said selected voting item and not displaying said marks associated with said voting items other than said selected voting item on said display means if it is detected that said selected-item information signal has been successfully transmitted.

2. A receiving apparatus comprising:

receiving means for receiving a video signal conveying a program;

display means;

display control means for controlling said display means to display pictures of a plurality of voting items of said program and a plurality of marks each associated with one of the plurality of voting items of said program;

transmitting means for transmitting a selected-item information signal conveying information on a selected one of said voting items when said selected one of said voting items is chosen;

transmission-status detecting means for detecting whether said selected-item information signal has been successfully transmitted by said transmitting means; and control means for controlling said display control means to display only one of said marks associated with said selected voting item and to inhibit display of said marks associated with said voting items other than the said selected voting item on said display means if said transmission-status detecting means detects that said selected-item information signal has been successfully transmitted by said transmitting means.

3. A receiving apparatus according to claim 1, wherein said receiving means receives a voting-item information signal conveying information on each of said voting items of said program and said display control means displays said marks on said display means in accordance with said voting-item information signal conveying information on each of said voting items received by said receiving means.

4. A receiving apparatus according to claim 1, wherein said transmitting means transmits said selected-item information signal through a telephone line.

5. A receiving apparatus according to claim 1, wherein said control means controls said display control means to display a picture on said display means to show that said selected-item information signal has been successfully transmitted by said transmitting means before controlling said display control means to display only one of said marks associated with said selected voting item on said display means when said transmission-status detecting means detects that said selected-item information signal has been successfully transmitted by said transmitting means.

6. A receiving apparatus according to claim 1, wherein said display control means controls said display means to display pictures of said marks for said voting items superposed on pictures conveyed by said video signal.

7. A receiving apparatus according to claim 1, wherein said control means controls said display control means to display said voting items on said display means as they are without regard to whether one of said voting items was selected when said transmission-status detecting means detects that said selected-item information signal has been successfully transmitted by said transmitting means.

* * * * *